(12) United States Patent  
Edelhaeusser et al.

(10) Patent No.: US 9,384,387 B2  
(45) Date of Patent: *Jul. 5, 2016

(54) CONCEPT FOR ENCODING DATA DEFINING CODED POSITIONS REPRESENTING A TRAJECTORY OF AN OBJECT

(75) Inventors: Thorsten Edelhaeusser, Nuremberg (DE); Hans Holm Fruehauf, Erlangen (DE); Michael Philippsen, Heroldsberg (DE); Gabriella Kókai; Joerg Nielson, legal representative, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 447 days.

This patent is subject to a terminal disclaimer.

(21) Appl. No.: 13/323,850

(22) Filed: Dec. 13, 2011

(65) Prior Publication Data

US 2012/0163463 A1 Jun. 28, 2012

Related U.S. Application Data

(60) Provisional application No. 61/426,706, filed on Dec. 23, 2010.

(30) Foreign Application Priority Data

Dec. 23, 2010 (EP) .................................. 10196851

(51) Int. Cl.
*H04N 19/139* (2014.01)
*G06K 9/00* (2006.01)
*H04N 19/513* (2014.01)

(52) U.S. Cl.
CPC .......... *G06K 9/00335* (2013.01); *H04N 19/139* (2014.11); *H04N 19/513* (2014.11)

(58) Field of Classification Search
None
See application file for complete search history.

(56) References Cited

U.S. PATENT DOCUMENTS 5,361,105 A * 11/1994 Iu ................................. 348/699
6,295,378 B1 9/2001 Kitakado et al.
(Continued)

FOREIGN PATENT DOCUMENTS

EP 0 107 196 A2 5/1984

OTHER PUBLICATIONS

Official Communication issued in corresponding European Patent Application No. 10196851.9, mailed on Aug. 4, 2011.
(Continued)

*Primary Examiner* — Kevin McInnish
(74) *Attorney, Agent, or Firm* — Keating & Bennett, LLP

(57) ABSTRACT

Encoder for encoding data defining coded positions representing a trajectory of an object based on spatio-temporal data representing a time series of positions of the object. The encoder comprises a deriver, a selector, and a coder. The deriver is configured for deriving a plurality of components of a motion vector difference between a last coded motion coded vector pointing from a second last coded position to a last coded position and a current motion vector pointing from the last coded position to a current position of the object. The selector is configured for selecting a component of the plurality of components of the motion vector difference. The coder is configured for coding the current motion vector based on the selected component of the motion vector difference to obtain a current coded motion vector, thereby defining a current coded position.

19 Claims, 15 Drawing Sheets

(56) References Cited

U.S. PATENT DOCUMENTS

| | | | |
|---|---|---|---|
| 6,473,458 B1* | 10/2002 | Shimizu et al. | 375/240.11 |
| 6,611,559 B1* | 8/2003 | Shingo et al. | 375/240.16 |
| 2008/0159596 A1* | 7/2008 | Li et al. | 382/107 |
| 2010/0079605 A1* | 4/2010 | Wang et al. | 348/208.4 |
| 2011/0080955 A1* | 4/2011 | Shi et al. | 375/240.16 |

OTHER PUBLICATIONS

Freeman, "Application of the Generalized Chain Coding Scheme to Map Data Processing," Proceedings of the Conference on Pattern Recognition and Image Processing IEEE, 1978, pp. 220-226.

Andrieux et al., "Coding Efficiency of Multi-ring and Single-ring Differential Chain Coding for Telewriting Application," IEE Proceedings: Vision, Image and Signal Proceeding, Institution of Electrical Engineers, vol. 148, No. 4, Aug. 29, 2001, pp. 241-247.

Hsieh et al., "Motion-Based Video Retrieval by Trajectory Matching," IEEE Transactions on Circuits and Systems for Video Technology, vol. 16, No. 3, Mar. 1, 2006, pp. 396-409.

Pelekis et al., "Similarity Search in Trajectory Databases," 14th International Symposium on Temporal Representation and Reasoning, (TIME '07) 2007, 12 pages.

Li et al., "Modeling of Moving Objects in a Video Database," IEEE, 1997, pp. 336-343.

Meratnia et al., "Trajectory Representation in Location-based Services: Problems & Solution," Proceedings of the Fourth International Conference on Web Information Systems Engineering Workshops (WISEW'03), 2004, 7 pages.

Kojima et al., "Generating Natural Language Description of Human Behavior from Video Images," IEEE, 2000, pp. 728-731.

Chen et al., "Symbolic Representation and Retrieval of Moving Object Trajectories", MIR'04, Oct. 15-16, 2004, New York, NY, pp. 227-234.

Potamias et al., "Sampling Trajectory Streams with Spatiotemporal Criteria", Proceedings of the 18th International Conference on Scientific and Statistical Database Management (SSDBM'06), 2006, 10 pages.

Potamias, "Compressing Trajectory Data of Moving Objects", Oct. 19, 2005, 5 pages.

Xu et al., "DTTC; Delay-Tolerant Trajectory Compression for Object Tracking Sensor Networks", Proceedings of the IEEE International Conference on Sensor Networks, Ubiquitous, and Trustworthy Computing (SUTC'06), 2000, 8 pages.

Cao et al., "Spatio-temporal Data Reduction with Deterministic Error Bounds", DIALM-POMC '03, Sep. 19, 2003, San Diego, CA, pp. 33-42.

Gandhi et al., "Space-efficient Online Approximation of Time Series Data: Streams, Amnesia, and Out-of-Order", IEEE, 2010, pp. 924-935.

Gudmundsson et al., "Compressing Spatio-temporal Trajectories", Computational Geometry—Theory and Applications, Jan. 31, 2008, pp. 1-32.

Nicolaucig et al., "Lossy Compression of TPC Data and Trajectory Tracking Efficiency for the ALICE Experiment", Nuclear Instruments and Methods in Physics Research A 500, 2003, pp. 412-420.

Edelhaeusser et al., "Concept for Encoding Data Defining Coded Orientations Representing a Reorientation of an Object", U.S. Appl. No. 13/323,852, filed Dec. 13, 2011.

Li et al., "Motion-Alert: Automatic Anomaly Detection in Massive Moving Objects", ISI'06 Proceedings of the 4th IEEE international conference on Intelligence and Security Informatics, 2006, 13 pages.

Meratnia et al., "A new perspective on trajectory compression techniques", Proceedings of ISPRS Commission II and IV, Working Groups II/5, II/6, IV/1 and IV/2 Joint Workshop on Spatial, Temporal and Multi-dimensional Data Modelling and Analysis, Oct. 2-3, 2003, Quebec city, Canada, pp. 1-8.

Schmid et al., "Semantic Trajectory Compression", 11th International Symposium, SSTD 2009 Aalborg, Denmark, Jul. 8-10, 2009 Proceedings, 6 pages.

Frentzos et al., "On the Effect of Trajectory Compression in Spatiotemporal Querying", 11th East European Conference, ADBIS 2007, Varna, Bulgaria, Sep. 29-Oct. 3, 2007, Proceedings, 16 pages.

* cited by examiner

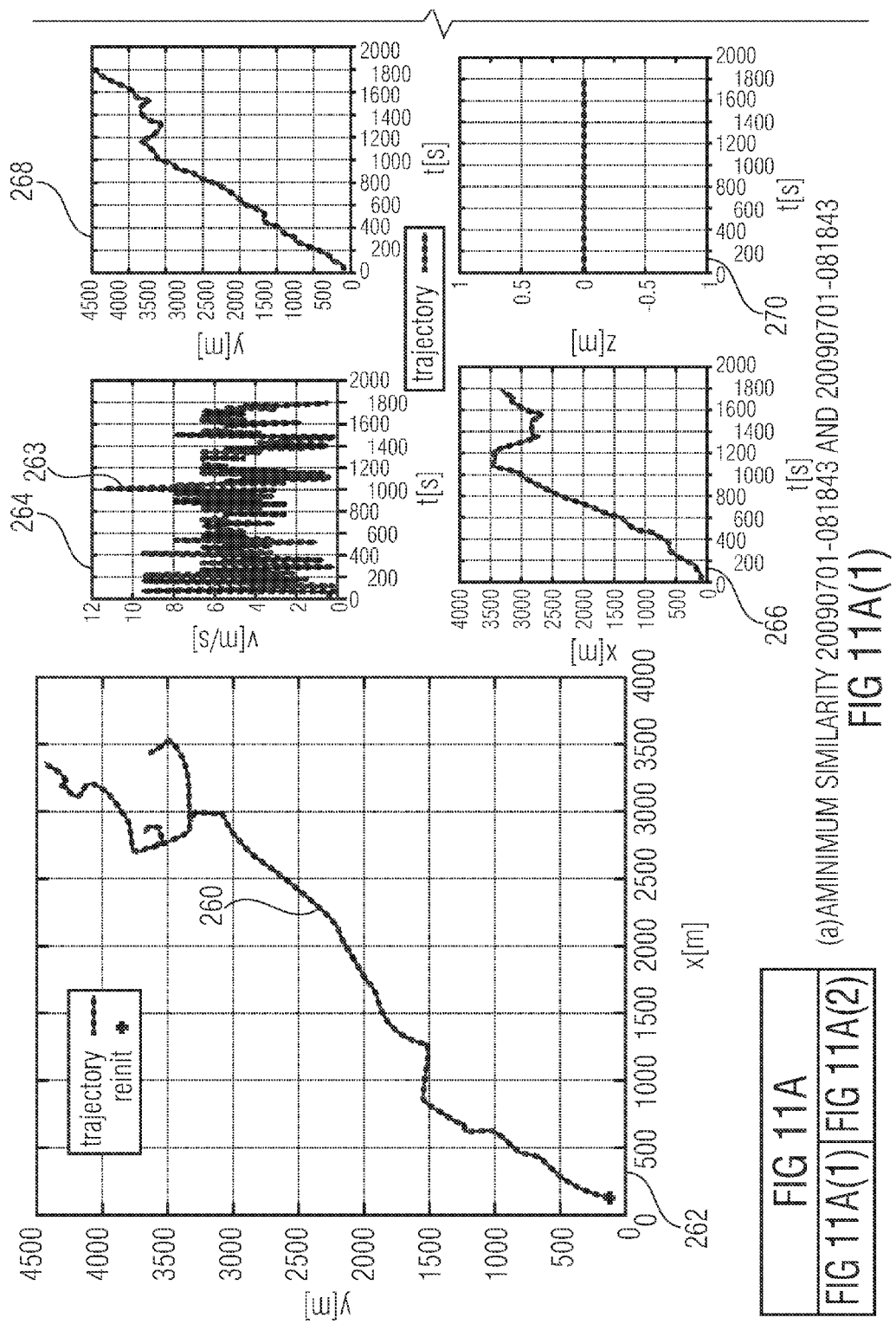

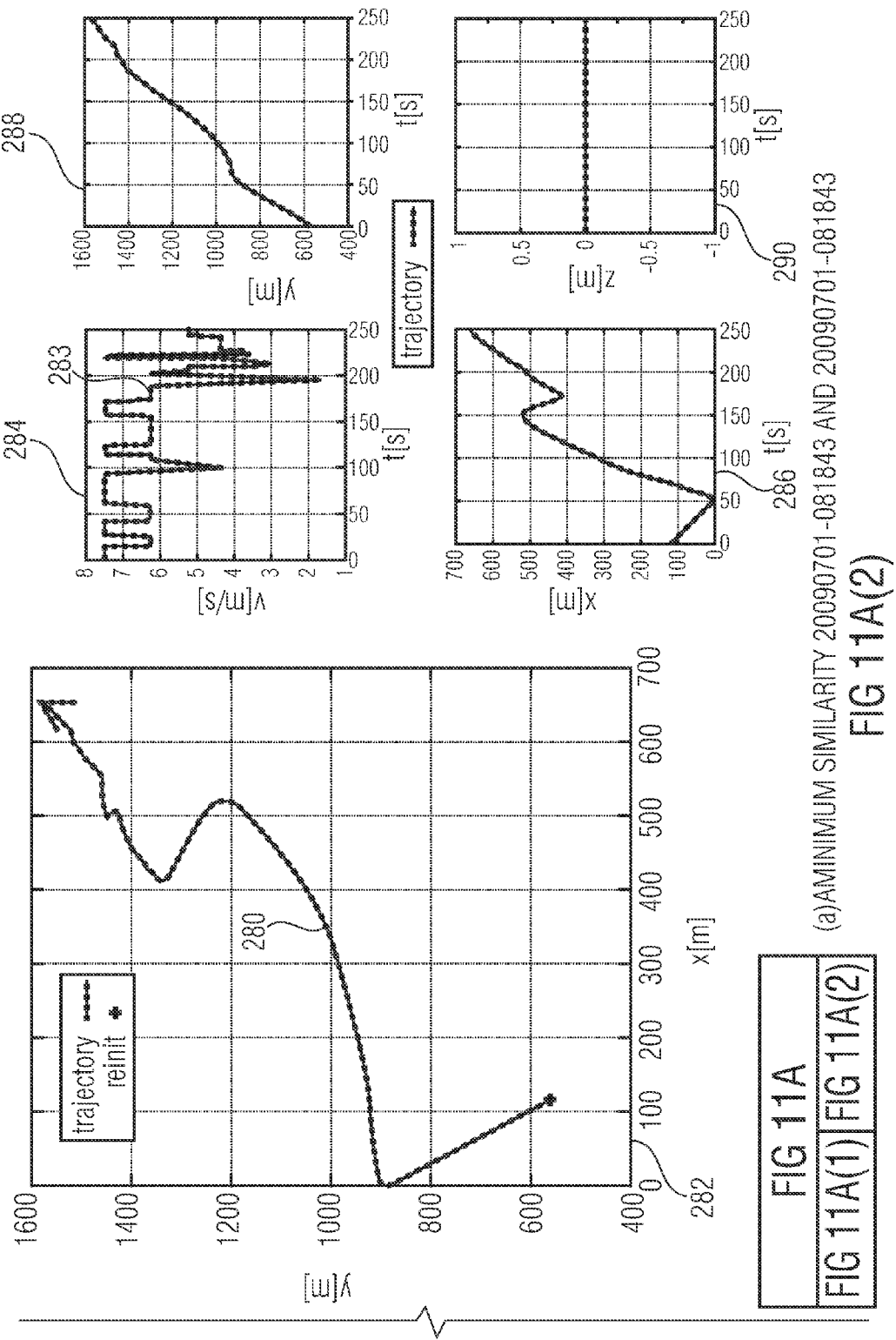

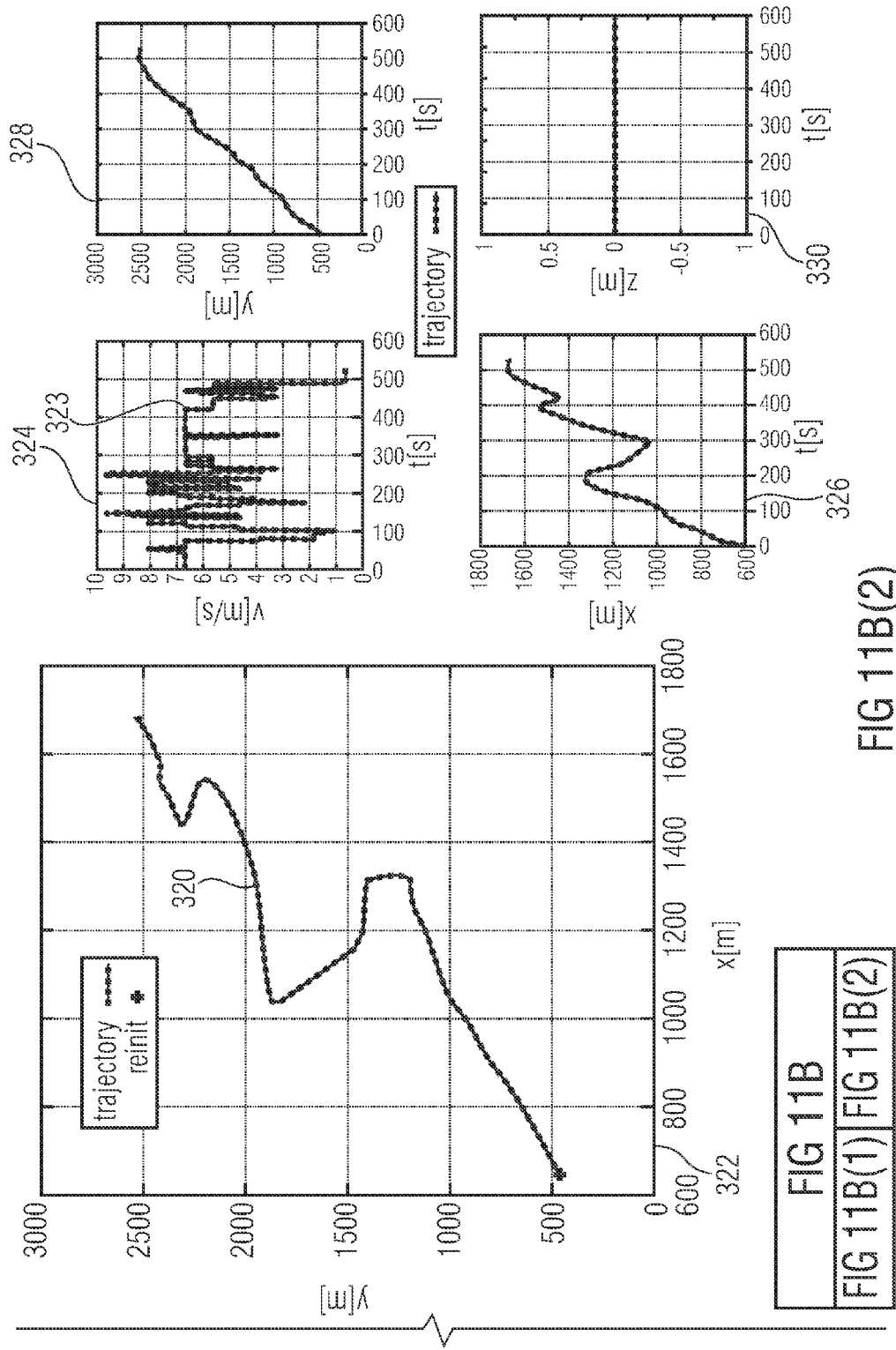

CONCEPT FOR ENCODING DATA DEFINING CODED POSITIONS REPRESENTING A TRAJECTORY OF AN OBJECT

CROSS-REFERENCE TO RELATED APPLICATIONS

This application claims priority from European Patent Application No. 10196851.9, which was filed on Dec. 23, 2010 and is incorporated herein in its entirety by reference.

Embodiments of the present invention relate to a concept for encoding data defining coded positions representing a trajectory of an object based on spatio-temporal data representing a time series of positions of the object.

BACKGROUND OF THE INVENTION

Traditional location systems rely on spatio-temporal data of located objects. Spatio-temporal data may be used for visualizing scenes, e.g. for an operator that directs bus drivers to the next free parking slot. Or for an autonomic monitoring system that checks if all objects are within a certain boundary and that gives an alarm if an object reaches into a dangerous area, for example, if a human reaches a pressing plant. But spatio-temporal representations reach their limits if more information on the object itself is useful, in particular, if the behavior is important. A good example is a soccer match, where a viewer wants to automatically detect an event, such as that a player is performing a sprint or that the ball is kicked. Just from spatio-temporal data such events can hardly be detected.

Spatio-temporal data is also not amenable to matching of trajectories. The reason is that trajectories have to be rotated, translated, and scaled, before a similarity can be detected. Also, coordinates are not intuitive for describing a trajectory. For example, a set of coordinates and time stamps along a synthetic trajectory have to be defined.

Current research on trajectory representation is mainly targeted to queries in databases, i.e. to search for similar stored trajectories or for time series with some specific characteristics. In the article "Similarity search in trajectory databases", N. Pelekis, I. Kopanakis, G. Marketos, I. Ntoutsi, G. Andrienko, and Y. Theodoridis introduce a set of similarity metrics for querying trajectories, that not only find similar trajectories but that also support trajectory clustering and mining tasks. Their distance operator, called Locality In-between Polylines (LIP), calculates the crossing area of two trajectories. Further, operators for time-aware spatio-temporal trajectory similarity search are defined. The underlying dataset consists of a classical spatio-temporal database.

In the article "Modeling of moving objects in a video database", J. Li, M. Ozsu, and D. Szafron introduce a trajectory representation of a sequence of motions, which are expressed on a series of displacement, moving direction and time interval. The moving direction can be one of the eight cardinal points (NT, NE, ET, SE, ST, SW, WT, NW). Trajectories are compared by a moving spatio-temporal relationship (mst-relation), which is a set of topological relations, directional relations and a time interval. This approach results in an abstraction and human readability of the spatio-temporal data, but does not allow a detailed reconstruction of the trajectory.

A grouping algorithm is shown in the article "Trajectory representation in location-based services: problems & solution" by Meratnia and de By to select regions in trajectories where the velocity or acceleration is constant. The trajectories are segmented by break points and represented by functions that are fitted into the resulting segments. The representation abstracts the trajectory in a very compact way, but does not allow a direct online approach, because a set of samples is needed for grouping. This introduces latency that is worth for online applications in Real-Time Location Systems (RTLSs).

In the article "Motion-alert: Automatic anomaly detection in massive moving objects", X. Li, J. Han, and S. Kim present a motion classifier that is based on movement features, called motifs. An object's path consists of a sequence of motif expressions, which are an abstraction of the underlying trajectory segment, at a given time and location, for example, "Right-Turn 3 am, 17". This abstraction level is suitable for classification task, but a detailed reconstruction of the original trajectory is not possible.

A similar approach is shown by A. Kojima, M. Izumi, T. Tamura, and K. Fukunaga in the article "Generating natural language description of human behavior from video images". The motion is described by a more human language inspired expression, with the objective to explain the object's behavior. The behavior is estimated by evaluating the pose and position in relation to surrounding objects. The main focus is to generate a human readable text, which is created by a machine translation technique. Since the objective is to maximize the readability for humans, the resulting text is not suitable for detail trajectory analysis.

A Movement Pattern String (MPS) is proposed by L. Chen, M. T. Özsu, and V. Oria in "Symbolic representation and retrieval of moving object trajectories" to represent trajectories as a string of symbols. The symbols are selected by calculating the movement direction and movement distance ratio for every sampling point and choosing the corresponding symbol from a quantization map. The similarity of two trajectory strings is determined by calculating the Edit Distance on Real Sequence (EDR), which is a derivation of the Levenshtein distance. The distance ratio needs to know the whole trajectory size that prohibit an online translation. Also the readability of the symbol string is less suitable for humans.

A resampling based concept is described in the article "A new perspective on trajectory compression techniques" from N. Meratnia and R. A. de By. A further resampling based concept is described in the article "Sampling trajectory streams with spatiotemporal criteria" from M. Potamias, K. Patroumpas, and T. Sellis. Another resampling based concept is described in the article "Compressing trajectory data of moving objects" from M. Potamias.

In the article "Semantic trajectory compression" from F. Schmid, K.-F. Richter, and P. Laube, a semantic based concept is described.

Y. Xu and W.-C. Lee describe in their article "Delay-tolerant compression for object tracking sensor network" a segmentation and approximation based concept. Thereby, trajectories are segmented and approximated via functions. Thereby, the segmentation necessitates an amount of points resulting in a high latency.

Further conventional technology is known from the article "Spatio-temporal data reduction with deterministic error" from H. Cao, O. Wolfson, and G. Trajcevski; the article "On the effect of trajectory compression in spatiotemporal querying" from E. Fretznos, and Y. Theodoridis; the article "Space-efficient online approximation of time series data: Streams, amnesia, and out of order" from S. Gandhi, L. Foschini and S. Suri; the article "Compressing spatio-temporal trajectories" from J. Gudmundsson, J. Katajainen, D. Merrick, C. Ong, and T. Wolle; and the article "Lossy compression of tpc data and trajectory tracking efficiency for the alice experiment" from A. Nicolaucig, M. Ivanov and M. Mattavelli.

Furthermore, when transmitting location data of a moving object at run time, as it is the case in real time location systems (RTLSs), large amounts of data or data quantities occur at high sample rates or with a high number of transmitted location data. For long time storage or transmission to mobile terminal devices, reducing the amount of data saves memory space or bandwidth, respectively. Since data mostly have to be processed in real time during transmission, classical compression techniques cannot be used here. The data have to be compressed and decompressed at run time without introducing process-induced latencies.

SUMMARY

According to an embodiment, an encoder for encoding data defining coded positions representing a trajectory of an object based on spatio-temporal data representing a time series of positions of the object may have: a deriver for deriving a plurality of components of a motion vector difference between a last coded motion vector pointing from a second last coded position to a last coded position and a current motion vector pointing from the last coded position to a current position of the object; a selector for selecting a component of the plurality of components of the motion vector difference; and a coder for coding the current motion vector based on the selected component of the motion vector difference to acquire a current coded motion vector, thereby defining a current coded position.

According to another embodiment, a decoder for decoding data defining coded positions representing a trajectory of an object based on spatio-temporal data representing a time series of positions of the object may have: a receiver for receiving a data item having a component value and a syntax element, the syntax element coding a selected component of a plurality of components of a motion vector difference between a last coded motion vector pointing from a second last coded position to a last coded position and a currently decoded motion vector pointing from a last coded position to a current coded position of the object, wherein the component value indicates the value of the selected component of the motion vector difference; and a deriver for deriving the current coded motion vector by applying the component value to the selected component of the last coded motion vector, the current coded motion vector thereby pointing from the last coded position to the current coded position.

According to another embodiment, a method for encoding data defining coded positions representing a trajectory of an object based on spatio-temporal data representing a time series of positions of the object may have the steps of: deriving a plurality of components of a motion vector difference between a last coded motion vector pointing from a second last coded position to a last coded position and a current motion vector pointing from the last coded position to a current position of the object; selecting a component of the plurality of components of the motion vector difference; and coding the current motion vector based on the selected component of the motion vector difference to acquire a current coded motion vector, thereby defining a current coded position.

According to another embodiment, a for decoding data defining coded positions representing a trajectory of an object based on spatio-temporal data representing a time series of positions of the object may have the steps of: receiving a data item having a component value and a syntax element, the syntax element coding a selected component of a plurality of components of a motion vector difference between a last coded motion vector pointing from a second last coded position to a last coded position and a currently decoded motion vector pointing from a last coded position to a current coded position of the object, wherein the component value indicates the value of the selected component of the motion vector difference; and deriving the current coded motion vector by applying the component value to the selected component of the last coded motion vector, the current coded motion vector thereby pointing from the last coded position to the current coded position.

Another embodiment may have a computer program having a program code for performing, when running on a computer or microprocessor, a method for encoding data defining coded positions representing a trajectory of an object based on spatio-temporal data representing a time series of positions of the object, which method may have the steps of: deriving a plurality of components of a motion vector difference between a last coded motion vector pointing from a second last coded position to a last coded position and a current motion vector pointing from the last coded position to a current position of the object; selecting a component of the plurality of components of the motion vector difference; and coding the current motion vector based on the selected component of the motion vector difference to acquire a current coded motion vector, thereby defining a current coded position.

Another embodiment may have a computer program having a program code for performing, when running on a computer or microprocessor, a method for decoding data defining coded positions representing a trajectory of an object based on spatio-temporal data representing a time series of positions of the object, which method may have the steps of: receiving a data item having a component value and a syntax element, the syntax element coding a selected component of a plurality of components of a motion vector difference between a last coded motion vector pointing from a second last coded position to a last coded position and a currently decoded motion vector pointing from a last coded position to a current coded position of the object, wherein the component value indicates the value of the selected component of the motion vector difference; and deriving the current coded motion vector by applying the component value to the selected component of the last coded motion vector, the current coded motion vector thereby pointing from the last coded position to the current coded position.

According to another embodiment, a data stream with data items defining coded positions representing a trajectory of an object based on spatio-temporal data representing a time series of positions of the object, may have: a component value and a syntax element, the syntax element coding a selected component of a plurality of components of a motion vector difference between a last coded motion vector pointing from a second last coded position to a last coded position and a currently decoded motion vector pointing from a last coded position to a current coded position of the object, wherein the component value indicates the value of the selected component of the motion vector difference.

In some embodiments, the deriver may be configured to derive a plurality of components of a next motion vector difference between the current coded motion vector pointing from the last coded position to the current coded position and a next motion vector pointing from the current coded position to the next position of the object. Thereby, the selector may be configured to select a component of the plurality of components of the next motion vector difference. Furthermore, the coder may be configured to code the next motion vector based on the selected component of the next motion vector difference to obtain a next coded motion vector, thereby defining a next coded position.

Furthermore, the deriver may be configured to derive the plurality of components of the motion vector difference such that a first component of the plurality of components corresponds to a first component of a coordinate system and a second component of the plurality of components corresponds to a second component of the coordinate system, wherein the coordinate system might be oriented relative to the last coded motion vector.

In addition, the selector may be configured to compare the absolute values of the plurality of components, and to select the component comprising the greater absolute value.

In some embodiments, a high compression rate of spatio-temporal data may be achieved by encoding merely or solely one component of the plurality of components of the motion vector difference between the last coded motion vector and the current motion vector. In a three dimensional space, the heading change of the object might be described by two components, or in other words, by a first component and a second component of the plurality of components of the motion vector difference. Since the object changes its heading usually or mainly only in one direction (or component), it is enough to encode the component (for example, first component or second component) of the motion vector difference comprising the greatest absolute value or directional change. Thereby, the absolute values of the plurality of components of the motion vector difference might be compared, wherein the component comprising the greatest absolute value might be selected and encoded. Furthermore, an error propagation is minimized by deriving the plurality of components of the motion vector difference in each encoding step based on the current motion vector pointing to the current or actual position of the object. Additionally, a velocity component of the object described by the current motion vector might be coded differentially to a past coded motion vector, for example, as an increase or decrease of velocity.

BRIEF DESCRIPTION OF THE DRAWINGS

Embodiments of the present invention will be detailed subsequently referring to the appended drawings, in which:

FIG. 11a shows a diagram of two similar trajectories and corresponding spatio-temporal appearances.

DETAILED DESCRIPTION OF THE INVENTION

Figure 1A:
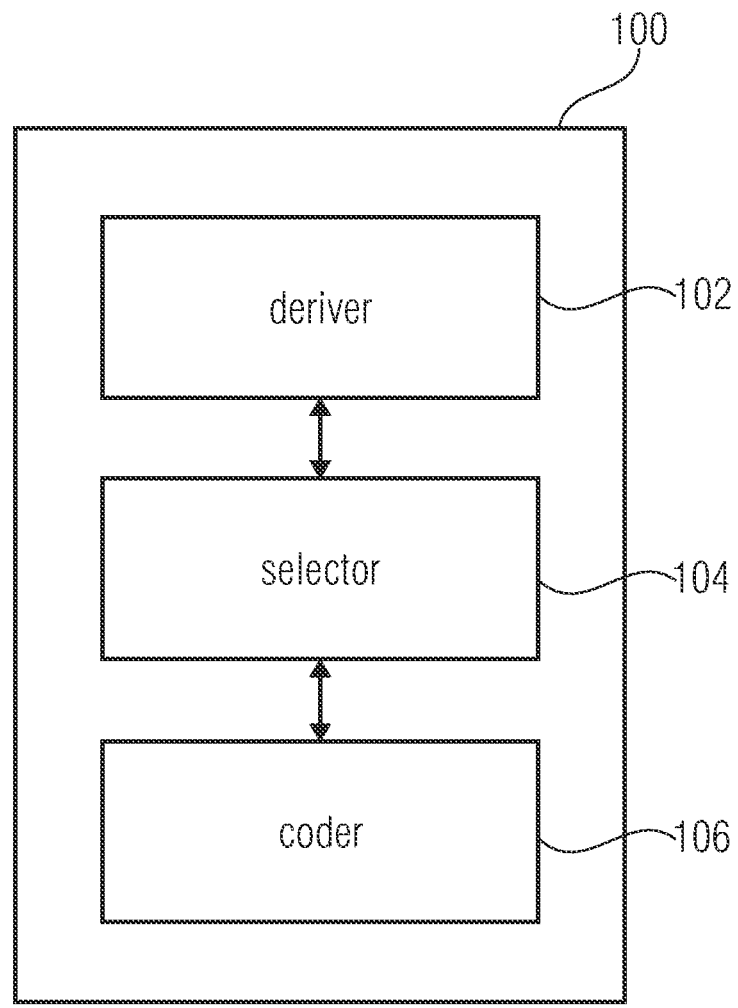
FIG. 1a shows a block diagram of an encoder for encoding data defining coded positions representing a trajectory of an object.

Equal or equivalent elements or elements with equal or equivalent functionality are denoted in the following description by equal or equivalent reference numerals.

FIG. 1a shows an encoder 100 for encoding data defining coded positions representing a trajectory of an object based on spatio-temporal data representing a time series of positions of the object. The encoder 100 comprises a deriver 102, a selector 104 and a coder 106. The deriver 102 is configured for deriving a plurality of components of a motion vector difference between a last coded motion vector pointing from a second last coded position to a last coded position and a current motion vector pointing from the last coded position to a current position of the object. The selector 104 is configured for selecting a component of the plurality of components of the motion vector difference. The coder 106 is configured for coding the current motion vector based on the selected component of the motion vector difference to obtain a current coded motion vector, thereby defining a current coded position. In some embodiments, the deriver 102, the selector 104 and the coder 106 may be implemented in an integrated circuit (IC), a field programmable gate array (FPGA) or a digital signal processor (DSP).

In the following, the functionality of the encoder 100 is exemplarily described with respect to an illustrative portion of a trajectory involving three consecutive positions, the portion being shown in FIG. 1b.

Figure 1B:
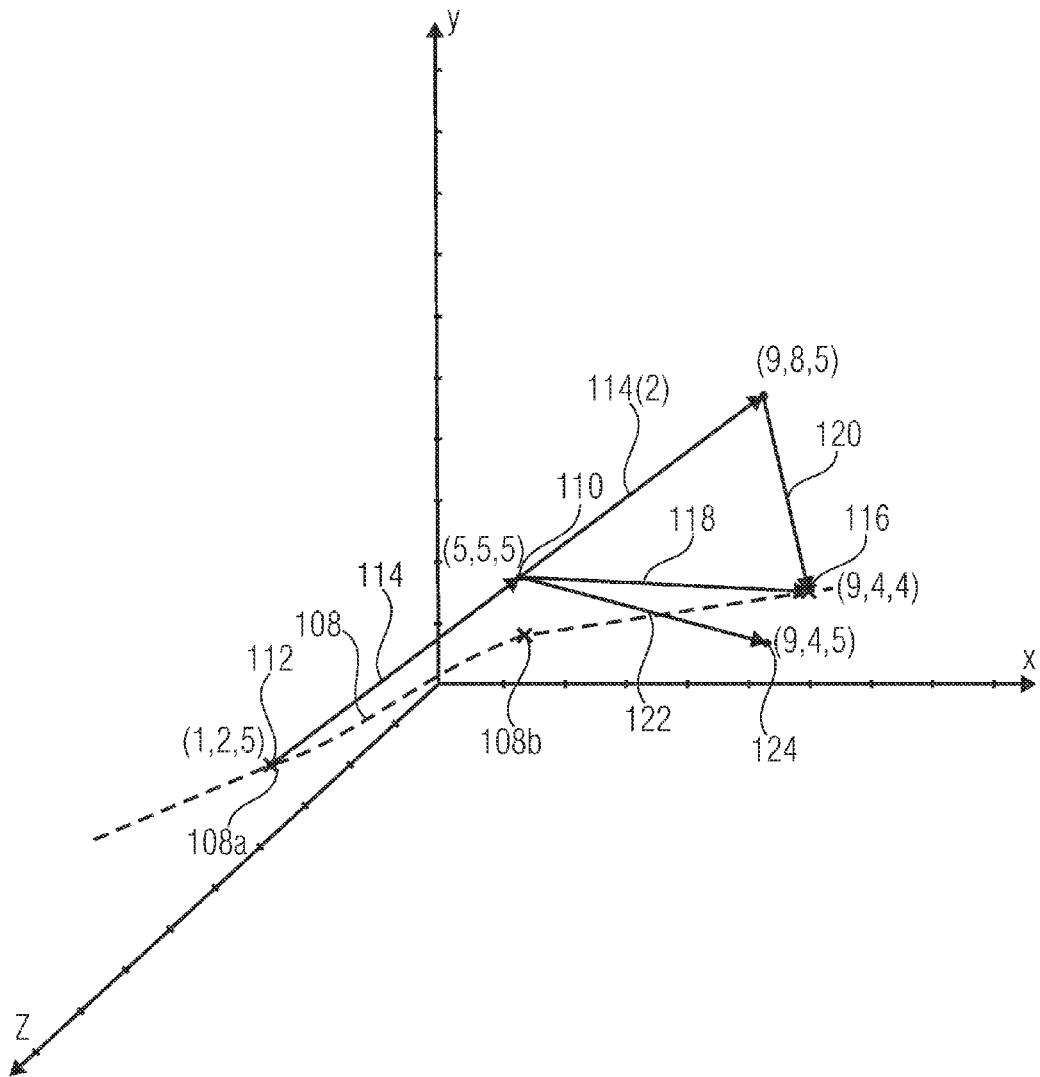
FIG. 1b shows a diagram with coded positions representing a trajectory of an object and a current position of the object to be encoded.

FIG. 1b shows a portion of the illustrative trajectory 108 of an object. The exemplary portion comprises two consecutive positions 108a, 108b, assumed to belong to a part of the trajectory 108 already having been encoded, and ends at a current position 116 of the object, currently to be encoded.

When entering the encoder 100, the time series of positions of the object might be described by a stream of spatio-temporal data. For example, each position may be described by a tuple of values, namely position such as (x,y,z) plus time instant t, i.e. (x,y,z,t). Alternatively, the sequence of positions of the trajectory might be defined by a sequence of position values (x,y,z) only, with a constant time interval between these positions by convention. The sequence of positions 108a, 108b, and 116 might have been detected by any position sensor or even an integrating velocity sensor, or a twice-integrating acceleration sensor. The sampling rate of the sensor may be constant or varying.

In FIG. 1b, the trajectory 108 of the object and its positions 108a, 108b and 116 are shown in a x-y-z-coordinate system with a x-component, a y-component and z-component perpendicular to each other (Cartesian coordinate system).

As will be described in more detail below, the encoder is configured to encode the sequence of positions by use of motion vectors pointing from one position to the next. Further, the encoder sacrifices a little bit of accuracy in favor of data compression.

The encoded trajectory of the object as derivable from the encoded data output by encoder 100, comprises a coded position 110, 112 and 124 per actual position of the trajectory. As shown in FIG. 1b, the coded positions and the actual positions do not completely coincide. However, the encoded trajectory connecting the coded positions closely extends along the actual trajectory 108. As will become clear from the discussion below, the loss of accuracy in encoding the trajectory is more than compensated by the compression rate achieved by the encoding scheme of encoder 100.

A last coded position 110 and a second last coded position 112 are assumed to have already been encoded. A last motion vector 114 points from the second last coded position 112 to the last coded position 110. The coordinates of the last coded position 110 are exemplarily chosen to be (5, 5, 5), wherein the coordinates of the second last coded position 112 are exemplarily chosen to be (1, 2, 5). FIG. 1b shows furthermore the current position of the object, wherein a current motion vector 118 points from the last coded position 110 to the current position 116 of the object. The coordinates of the current position 116 of the object are exemplarily chosen to be (9, 4, 4).

As is shown in FIG. 1b, coded position 112 exemplarily coincides with its associated position 108a, while coded position 110 exemplarily deviates from its associated actual position 108a which is assumed to be (5,5,4).

As shown in FIG. 1b, encoder 100 uses motion vectors to describe the trajectory 108 of the object. In the following, several kinds of motion vectors have to be distinguished. Actual motion vectors point from one actual position to the next. These motion vectors are not illustrated in FIG. 1b, as these motion vectors are not necessary for understanding the principles of the present embodiment. Next, motion vectors currently to be coded point from the last coded position, here 110, to the actual position currently to be coded. Here, this is vector 118. Finally, coded motion vectors point from one coded position to the next. As will be described below, the motion vector 118 pointing to the current position 116 may deviate from the coded motion vector 122 which is finally coded for pointing to the coded version of the current position, namely the current coded position 124. At the decoding side, merely the latter sort of motion vectors are reconstruct able, and, accordingly, merely the coded positions.

Each coded motion vector may be represented by a heading and a velocity information. The velocity information indicates a length of the coded motion vector, while the heading indicates a direction thereof. In the embodiments described further below, this kind of representation is used. It is advantageous because mostly the velocity of the object changes more slowly than the direction thereof.

If the object moved forward without any change in heading and velocity, then the current coded motion vector would be equal to the last coded motion vector 114. In that case, the current coded position would be easily encoded by encoder 100 by indicating in the coded bit stream the repeated application of the most recent motion vector, or the motion vector difference between both being zero, respectively. In the present case, the current coded position would have been (9,8,5). The current motion vector of that case is depicted in FIG. 1b with the referential numeral 114(2).

If merely the object's velocity keeps constant, then the heading change of the object can be described by use of merely two component values, as will be described further below, namely a first component and a second component of the plurality of components of the motion vector difference 120. In the following embodiments, two angles are used to describe heading changes from the last coded positions to the current (coded) positions.

In some applications, the object changes its heading mainly only in one plane, such as horizontally or vertically. Even more severe, however, is the fact, that mostly, the sampling rate of the positions of the trajectory 108 is high enough to encode merely one selected component of the two heading change components of the current motion vector leading to the current coded position. In the following embodiment, for example, the greater of the two components is selected. The deviation of the currently coded position 124 from the actual current position 116 is taken into account when encoding the subsequent position of the trajectory 108 not show in FIG. 1b for simplicity reasons. In principle, the encoding of merely the greater one of the two heading change components per position leads to a back and forth switching between the two components during coding the trajectory 108. One component such as the horizontal heading change angle, is selected as long as the vertical heading change angle does not exceed the horizontal heading change angle due to the afore-mentioned deviations summing-up to a too high amount. As soon as the vertical heading change angle exceeds the horizontal heading change angle, the deviation in vertical direction is compensated by coding the vertical heading change angle. Upon this, the decoding side is "re-adjusted" again. In other words, according to below outlined embodiments, it is enough to code the component of the plurality of components of the motion vector difference comprising the greatest absolute value or directional change. In some embodiments, the selector 104 may be configured to compare the absolute values of the plurality of components of the motion vector difference 120, and to select the component comprising the greatest absolute value. The coder 106 may be configured for coding the current motion vector 118 based merely on the selected component of the motion vector difference 120 to obtain a current coded motion vector 122, thereby defining a current coded position 124. Thereby, a high compression rate of the original spatio-temporal data may be achieved.

In some embodiments, the plurality of components of the motion vector difference 120 might be weighted in order to achieve a better resolution in a predefined plane (or component). Thereby, the selector 104 may be configured for weighting the absolute values of the plurality of components. Furthermore, the selector may be configured for comparing the weighted absolute values of the plurality of components of the motion vector difference 120 and for selecting the component comprising the greatest weighted absolute value.

In FIG. 1b, it has been exemplarily assumed that the deriver 102 derives three components representing the motion vector difference 120, namely the components along x, y, and z. In the present case, the encoder has chosen to code the component in y, but not to code the x and z components of the motion vector difference, thereby achieving less data to be coded. Thus, coder 106 merely outputs a data item to describe the current coded position 124 (and the current position 116, respectively), which indicates the absence of the x and z components (by use of appropriate syntax elements examples of which are described below), and indicates the y component motion vector difference to be −4. The current coded position 124 thus comprises the coordinates (9, 4, 5) and deviates therefore from the current or actual position of the object 116 at the coordinates (9, 4, 4). According to the concept of the present embodiment, an error propagation is reduced by deriving the selected component of the motion vector difference 120 in each encoding step based on the current motion vector 118 pointing to the current or actual position 116 of the object. Hence, the error of the current coded position 124 may be reduced in a next encoding step while encoding the next position of the object. Naturally, the selector 104 may choose to select more than one component of x,y,z for all or some of the positions in accordance with an alternative embodiment. Hereinafter, however, the embodiments describe the heading change merely by two components with restricting the selection out of those, with treating the velocity component separately.

Accordingly, in accordance with the below embodiments, the deriver 102 may be configured to derive a first component and a second component (or a plurality of components) of a next motion vector difference between the current coded motion vector 122 pointing from the last coded position 110 to the current coded position 124 and a next motion vector pointing from the current coded position 124 to the next position of the object. Thereby, the selector 104 may be configured to select the first or the second component (or a component of the plurality of components) of the next motion vector difference. In addition, the coder may be configured to code the next motion vector based on the selected component of the next motion vector difference to obtain a next coded motion vector, thereby defining a next coded position. The selected component may differ from the y component selected immediately before.

Furthermore, a velocity component of the object described by the current motion vector 118 might be coded. Therefore, the coder 106 may be configured to code a velocity component of the current coded motion vector 122. In some embodiments, the coder 106 may be configured to code a velocity component of the current coded motion vector 122 differentially to a past coded motion vector. The velocity component may be measured along the direction of the last coded motion vector 114. Alternatively, the velocity component may be measured along the direction of a combination of the last coded motion vector 114 and the selected component (first or second component) of the motion vector difference 120, namely along the coded motion vector 122.

In some embodiments, the deriver 102 may be configured to derive the plurality of components of the motion vector difference 120 such that a first component corresponds to a first component of a coordinate system and the second component corresponds to a second component of the coordinate system, wherein the coordinate system may be oriented relative to the last coded motion vector 114. That is, the system may be a global, fixed reference system as shown in FIG. 1b by x, y, and z. The coordinate system may be a polar coordinate system, a cylindrical coordinate system or a spherical coordinate system.

Alternatively, the system may be a trajectory or object related local coordinate system. For example, a polar coordinate system may be used, with a polar angle and a azimuth angle defined relative to the direction of the last coded vector 108, serving as the two heading change components. Alternatively, the deriver 102 may be configured to derive the plurality of components of the motion vector difference such that a first component corresponds to a first component of a affine coordinate system and a second component corresponds to a second component of the affine coordinate system, wherein the first and the second components of the affine coordinate system are perpendicular to a third component of the affine coordinate system corresponding to a direction of the last coded motion vector. Thereby, the affine coordinate system may be a Cartesian coordinate system, wherein the origin of the Cartesian coordinate system may be arranged or oriented at the last coded position 110. The z-component of the Cartesian coordinate system may point in the direction of the last coded motion vector 114, wherein the x-component may correspond to the first component of the motion vector difference 120, wherein the y-component of the Cartesian coordinate system may correspond to the second component of the motion vector difference 120, with the selection being performed between the latter two components x and y.

Furthermore, the deriver may be configured to derive the plurality of components of the motion vector difference such that a first and a second component of the plurality of components are two components of a three dimensional system comprising an axis pointing into the direction of the last coded motion vector, wherein the first and the second component are perpendicular to the axis.

In some embodiments, the deriver 102 may be configured to derive the plurality of components of the motion vector difference 120 such that a first component corresponds to a first component of a coordinate system and a second component corresponds to a second component of the coordinate system. The first component of the coordinate system may be a first angle $\alpha_1$ measured relative to the last coded motion vector 114 in a plane spanned by the last coded motion vector 114 and a first vector. The second component of the coordinate system may be an second angle $\alpha_2$ measured in a plane spanned by the last coded motion vector 114 and a second vector, perpendicular to the first vector. In the following embodiments this convention is used, with the first vector pointing along the vertical (fixed or global) direction y, i.e. the zenith. An origin of the coordinate system might be arranged at the last coded position 110, wherein the first vector may correspond to the y-component of the Cartesian coordinate system shown in FIG. 1b (vertical component), wherein the second vector may be perpendicular to the first vector and to the last coded motion vector 114.

Thus, coder 106 may generate a sequence of data items defining the coded positions by way of defining a sequence of motion vector differences. Some data items may be constructed such that they comprise, optionally, a mode syntax element specifying the selected component (such as out of $\alpha_1$ and $\alpha_2$), the selected component (thereby defining the heading change), and, facultatively, a coding of the velocity, such as a mode syntax element indicating a velocity change, followed by a velocity difference. Other data items may be possible as well, as will be described below, such as data items including a mode syntax element indicating the absence of both heading change and velocity change. Moreover, a run length coding scheme may be used to further reduce data rate, if decoding delay or real time is not critical.

In some embodiments, the encoder 100 may comprise an output to provide a data item, wherein a sequence of data items may be a data stream. The data item may comprise a syntax element and a component value. The syntax element may code the selected component of the plurality of components of the motion vector difference 120. In some embodiments the syntax element may indicate a direction, such as forward (f), right (r), left (l), top (t) or bottom (b), wherein the component value may indicate the value of the selected component of the motion vector difference 120. In addition, the syntax element may indicate a velocity component, such as an increase or decrease of velocity. The velocity component may alternate the length of the coded motion vector, wherein an increase of velocity may lead to an increase of the length of the coded motion vector, wherein a decrease of velocity may lead to a decrease of the length of the coded motion vector.

Furthermore, the coder 106 may be configured to code the current motion vector as a syntax element signaling a repeated application of a last syntax element coding a last motion vector if the selected component of the motion vector difference is the same as a selected component of a last motion vector difference and if the selected component of the motion vector difference and the selected component of the last motion vector difference comprise the same value. For example, if the object is moving forward with constant velocity and heading, or in other words, without any change in direction or velocity, then the syntax element may signal a repeated application of the last syntax element. A repeated application of the last syntax element may be signaled up to n times, wherein n may be natural number. The syntax element may also indicate that the last syntax element may be applied n times. Moreover, the syntax element may indicate a repeated application of a block of m syntax elements, wherein m may be a natural number. The block of m syntax elements may code a trajectory of an object, wherein a repeated application of the block of m syntax element may code a repetition of the same trajectory. Thereby, the trajectory may comprise a plurality of different syntax elements signaling directional changes, such as right (r) and left (l), including syntax elements signaling changes in velocity.

In some embodiments, the encoder 100 may be configured for encoding data, wherein the data may further define a orientation of the object at the time series of positions of the object. Thereby, the encoder 100 may be configured to encode a component of the plurality of components defining the orientation of the object. Or in other words, in some embodiments, the encoder 100 may be configured to encode at the same time the position of the object as described above and the orientation of the object as described in the below embodiments. Thereby, the encoder 100 may be configured to encode the position and orientation of the object in each (encoding) time step. Alternatively, the encoder may be configured to use different sampling rates or (encoding) time steps for encoding the position and orientation of the object, respectively. For example, in a first encoding time step the position of the object might be encoded, wherein the orientation of the object might be encoded in a second encoding time step.

For encoding the orientation of the object, the deriver 102 may be further configured for deriving a plurality of components describing an orientation change difference between a last coded orientation change from a second last coded orientation to a last coded orientation, and a current orientation change from the last coded orientation to a current orientation of the object. The selector 104 may be configured for selecting a component of the plurality of components describing the orientation change difference. The coder 106 may be configured for coding the current orientation of the object based on the selected component of the plurality of components describing the orientation change difference, thereby defining a current coded orientation.

In some embodiments, the deriver may be configured to derive a next plurality of components describing an orientation change difference between a current coded orientation change from a last coded orientation to a current coded orientation, and a next orientation change from the current coded orientation to a next orientation of the object. Thereby, the selector may be configured to select a component of the next plurality of components describing the next orientation change difference. Furthermore, the coder may be configured to code the next orientation of the object based on the selected component of the next plurality of components describing the next orientation change difference, thereby defining a next coded orientation.

Furthermore, the deriver 102 may be configured to derive the plurality of components describing the orientation change difference such that the plurality of components correspond to Euler angles of a reference system, such as the Cartesian coordinate system. The Euler angles may be used to describe the orientation of the object, for example, a rigid body. To describe the orientation in a three dimensional space three parameters ($\psi$, $\theta$, $\Phi$) may be used. Thereby, any orientation may be achieved by composing three elemental rotations, such as rotations around the axis of a reference coordinate system. In other words, Euler angles are a means of representing the spatial orientation of the object described by a coordinate system as a composition of rotations from a reference coordinate system.

In addition, the selector may be configured to compare the absolute values of the plurality of components, and to select the component comprising the greatest absolute value.

In some embodiments, a high compression rate of spatiotemporal data may be achieved by encoding merely or solely one component of the plurality of components describing the orientation change difference between the last coded orientation change and the current orientation change. In a three dimensional space, the orientation change of the object might be described by three components. Since in each encoding step the object changes its orientation usually or mainly only in one direction (or component), it is enough to encode the component of the plurality of components (describing the orientation change difference) comprising the greatest absolute value. Thereby, the absolute values of the plurality of components describing the orientation change difference might be compared, wherein the component comprising the greatest absolute value might be selected and encoded. Furthermore, an error propagation may be minimized by deriving the plurality of components describing the orientation change difference in each encoding step based on the current orientation change to the current (or actual) orientation of the object.

Figure 1C:
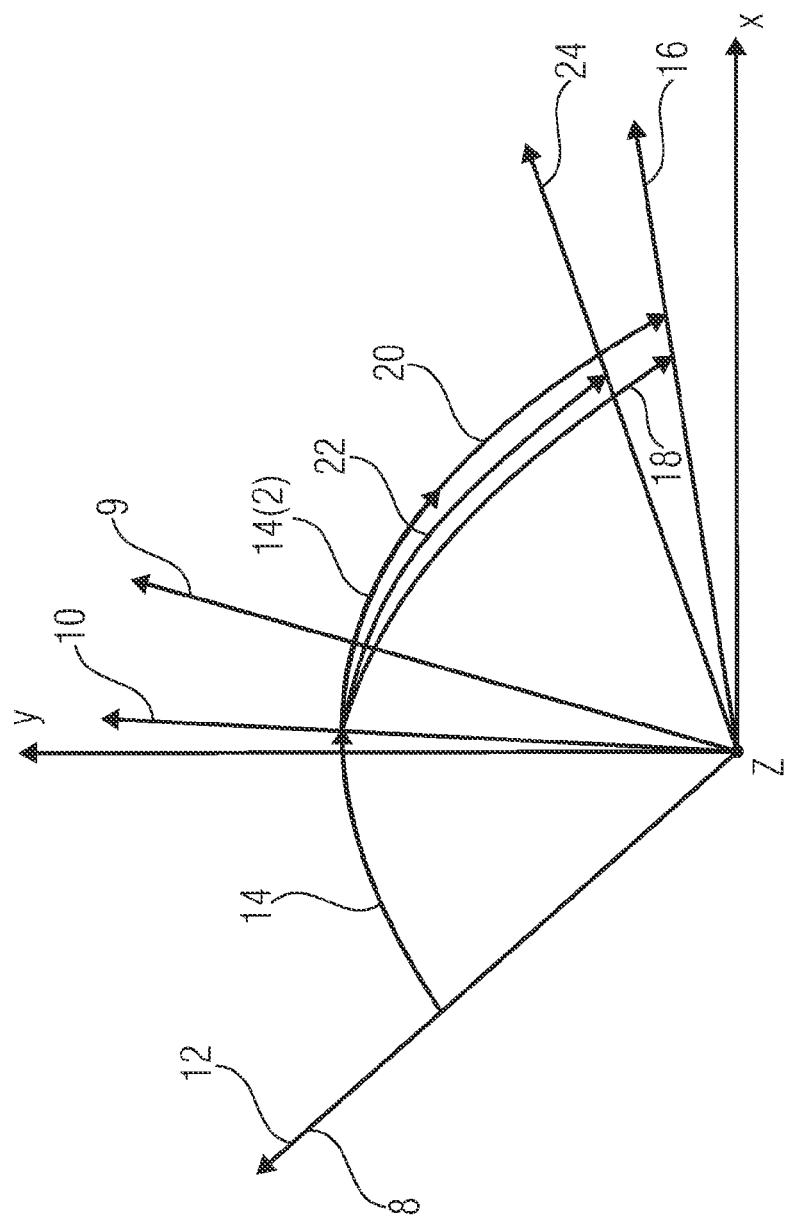
FIG. 1c shows a diagram with coded orientations representing a reorientation of an object and a current orientation of the object to be encoded.

FIG. 1c shows a portion of the illustrative reorientation of the object. The exemplary portion comprises two consecutive orientations 8 and 9, assumed to belong to a portion of the reorientation of the object already having been encoded, and ends at a current orientation 16 of the object, currently to be encoded.

When entering the encoder 100, the time series of orientations of the object might be described by a stream of spatiotemporal data. For example, each orientation may be described by a tuple of values, namely a orientation such as ($\psi$, $\theta$, $\Phi$) plus time instant t, i.e. ($\psi$, $\theta$, $\Phi$, t). Alternatively, the sequence of orientations might be defined by a sequence of orientation values ($\psi$, $\theta$, $\Phi$) only, with a constant time interval between these orientations by convention. The sequence of orientations 8, 9 and 16 might have been detected by any orientation sensor.

In FIG. 1c, the orientations 8, 9 and 16 are shown in a x-y-z-reference coordinate system with an x component, a y component and a z component perpendicular to each other (Cartesian coordinate system).

As will be described in more detail below, the encoder 100 may be configured to encode the sequence of orientations by use of orientation change differences between one coded orientation change and the next.

As shown in FIG. 1c, the coded orientations 10, 12 and 24 and the actual orientations 8, 9 and 16 do not completely coincide. However, the encoded reorientation of the object described by the coded orientations closely extends along the actual reorientation of the object described by the actual orientations of the object. Thereby, the loss of accuracy in encoding the reorientation of the object is more than compensated by the compression rate achieved by the encoding scheme of the encoder 100.

A last coded orientation 10 and a second last coded orientation 12 are assumed to have already been encoded. A last coded orientation change 14 describes a reorientation of the object from the second last coded orientation 12 to the last coded orientation 10. FIG. 1c furthermore shows the current orientation 16 of the object, wherein a current orientation change 18 describes a reorientation of the object from the last coded orientation 10 to the current orientation 16 of the object.

As shown in FIG. 1c, the encoder 100 may use orientation changes to describe the reorientation of the object, wherein the encoder 100 may be configured to encode the sequence of orientations by use of orientation change differences, for example, between the last coded orientation change 14 and the current orientation change 18. In the following, several kinds of orientation changes have to be distinguished. Actual orientation changes describe a reorientation of the object from one actual orientation to the next. These orientation changes are not illustrated in FIG. 1c, as these orientation changes are not necessary for understanding the principles of the present embodiment. Next, orientation changes currently to be coded describe a reorientation of the object from the last coded orientation, here 10, to the actual orientation currently to be coded. Here, this is the orientation change 18. Finally, coded orientation changes describe a reorientation of the object from one coded orientation to the next. Thereby, the current orientation change 18 describing the reorientation of the object to the current orientation 16 may deviate from the coded orientation change 22 which is finally coded for describing the reorientation of the object to the coded version of the current orientation, namely the current coded orientation 24. At the decoding side, merely the latter sort of orientation changes are reconstruct able, and accordingly, merely decoded orientations.

If the object's orientation is changing constantly, such as is the case if the object is rotating around an axis with constant velocity, then the current coded orientation change would be equal to the last coded orientation change 14. In that case, the orientation change difference 20 between the last coded orientation change 14 and the current coded orientation change would be zero. The current coded orientation change of that case is depicted in FIG. 1c with the referential numeral 14(2).

In some applications, the object changes its orientation mainly only in one plane, such as horizontally or vertically. Even more severe, however, is the fact, that mostly the sampling rate of the orientations is high enough to encode merely one selected component of the plurality of components describing the orientation change difference between the last coded orientation change and the current orientation change leading to the current coded orientation. Thereby, the component comprising the greatest absolute value may be selected and encoded. The deviation of the currently coded orientation 24 from the actual current orientation 16 is taken into account when encoding the subsequent orientation of the object not shown in FIG. 1c for simplicity reasons.

In principle, the encoding of merely the greatest one of the plurality of components describing the orientation change difference 20 leads to a back and forth switching between the plurality of components during coding the reorientation of the object. One component, such as the horizontal orientation change difference angle, may be selected as long as the vertical orientation change difference angle does not exceed the horizontal orientation change difference angle due to the aforementioned deviations summing-up to a to high amount. As soon as the vertical orientation change difference angle exceeds the horizontal orientation change difference angle, the deviation in vertical orientation may be compensated by coding the vertical orientation change difference angle. Upon this, the decoding side may be (readjusted again). Thereby, a high compression rate of the original spatio-temporal data may be achieved.

In FIG. 1c, it has been exemplarily assumed that the deriver 102 derives three components representing the orientation change difference 20, namely the components ($\psi$, $\theta$, $\Phi$). In the present case, the encoder 100 has chosen to code the component in $\psi$ (around the z-component of the reference system), but not to code the $\theta$ and $\Phi$ components of the orientation change difference 20, thereby achieving less data to be coded. Thus, the coder 106 merely outputs a data item to describe the current coded orientation 24 (and the current orientation 16, respectively), which indicates the absence of the $\theta$ and $\Phi$ components (by use of appropriate syntax elements examples of which are described below). The current coded orientation 24 deviates therefore from the current or actual orientation 16 of the object. According to the concept of the present embodiment, an error propagation is reduced by deriving the selected component of the orientation change difference 20 in each encoding step based on the current orientation change 18 describing a reorientation of the object from the last coded orientation 10 to the current orientation 16 of the object. Hence, the error of the current coded orientation 24 may be reduced in a next encoding step while encoding the next orientation of the object. Naturally, the selector 104 may choose to select more than one component of the plurality of components (for example $\psi$, $\theta$ and $\Phi$) for all or some of the orientations in accordance with an alternative embodiment.

Figure 2:
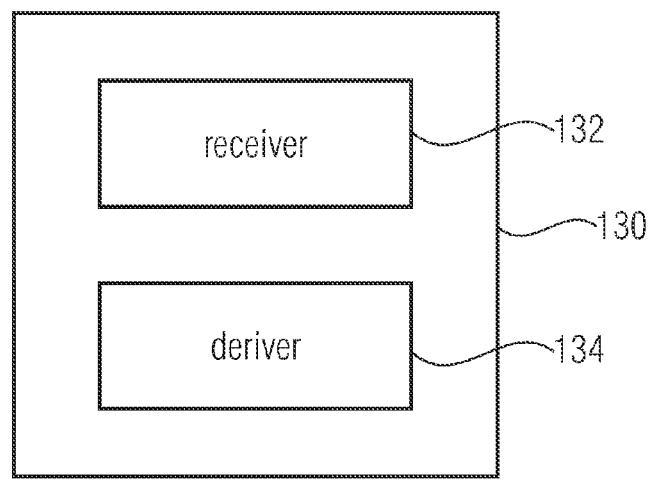
FIG. 2 shows a block diagram of a decoder for decoding data defining coded positions representing a trajectory of an object.

FIG. 2 shows a block diagram of a decoder 130 for decoding data defining coded positions representing a trajectory of an object based on spatio-temporal data representing a time series of positions of the object. The decoder 130 comprises a receiver 132 and a deriver 134. The receiver 132 is configured for receiving a data item comprising a component value and/or a syntax element. The syntax element indicating as to whether the component value relates to a first component or to a second component of a motion vector difference between a last coded motion vector 114 pointing from a second last coded position 112 to a last coded position 110 and a currently decoded motion vector 122 pointing from a last coded position 110 to a current coded position 124 of the object. The deriver 134 is configured for deriving the current coded motion vector 122 by applying the component value to the first component or to the second component of the last coded motion vector 114 that is indicated by the syntax element. Thereby, the current coded motion vector is pointing from the last coded position 110 to the current coded position 124. In addition, the receiver 132 may be configured to receive a data item comprising a syntax element coding a velocity component of the currently decoded motion vector 122. Moreover, the receiver may receive a data stream, or in other words, a sequence of data items, wherein at least one data item comprises a component value and/or a syntax element.

In the following, an exemplary embodiment of encoding data defining coded positions representing a trajectory of an object is described. Thereby, the encoded data may comprise a plurality of data items with syntax elements and component values representing the trajectory of the object.

Figure 3:
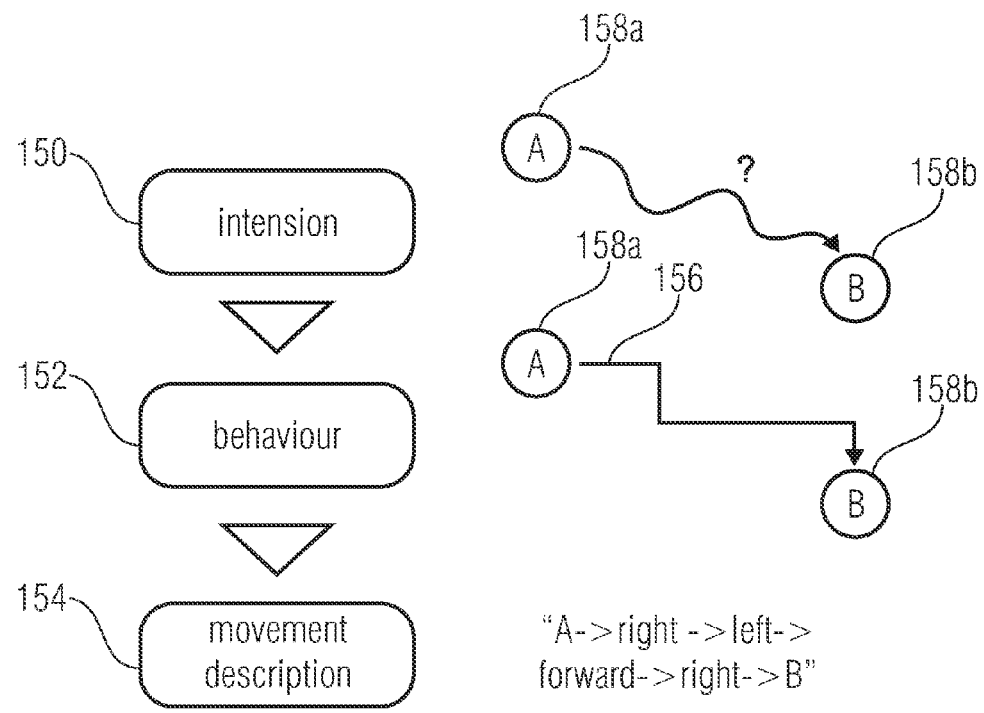
FIG. 3 shows in a diagram a motion of an object.

According to the concept of the present invention, a formal language may be used for the trajectory representation, or in other words, for encoding data defining coded positions representing a trajectory of an object. Subsequently, the formal language is referred to as trajectory behavior language (TBL). TBL may be used to describe the behavior of an object with a (simple human readable and) machine useable language. As illustrated in FIG. 3, it may be assumed that every motion of an object is based on an intension 150, where the object wants to go, followed, for example, by a behavior 152. The concept or approach of the present invention may motivate a movement description 154 that explains the trajectory 156 (from a point A or 158a to a point B or 158b) in a semantic way, but allows a detailed reconstruction of the original trajectory 156.

Furthermore, it is possible to translate a trajectory from spatio-temporal data into the trajectory representation of the TBL and convert it back with no or little error. The translation algorithm may be latency free, i.e. a spatio-temporal data stream may be translated without needing more than the current sample at every time step. The TBL has special expressions for repeated motions. This results in a compact form of representation that is easier to read and that can compress the size of the description. In contrast to common or known trajectory representations that rely on a conversion from spatio-temporal data into a description of the trajectory 156 based on the objects motion vector, the approach or concept of the present invention encodes or translates this vector into a formal language that explains the movement in a descriptive way abstracted from the object's intension 150. As already mentioned, the formal language is referred to herein as trajectory behavior language (TBL) and may be constructed by a Chomsky-2 context free grammar to allow an online translation process with no latency.

Figure 4:
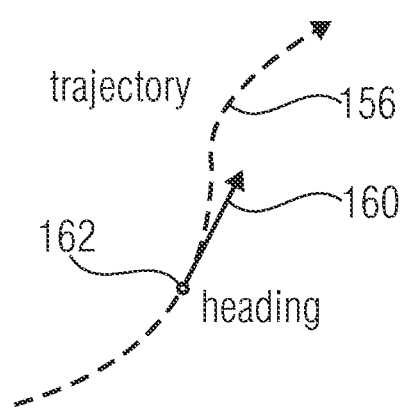
FIG. 4 shows in a diagram a heading of an object within a trajectory.

The TBL can separate velocity information from motion. The latter may be based on the heading change of the object, where the heading is the direction into which the object is moving. FIG. 4 illustrates the heading 160 of a given point 162 within a trajectory 152. Based on the separation of velocity and motion, it's possible to examine speed changes and motion patterns on their own. If, for example, the same trajectory 152 is performed twice, but with two different speeds, the comparison of the motion is easier than with a conventional representation.

There are no special symbols for turning. Thereby, it may be assumed that every turning is included in a motion. This does not exclude a turn on place, because the turn on place may be represented by a motion with zero velocity. This may reduce the number of symbols (or data items comprising syntax elements and/or component values) and does not limit the possibilities.

Moreover, the TBL can be constructed by the Chomsky-2 context free grammar $G_{TBL}$. $G_{TBL}$ may consist of a vocabulary V including the alphabet $\tau$ and a set of production rules P. The latter may define rules for constructing words $\omega$ by substituting the non-terminal symbols V by terminal symbols of $\Sigma$.

In the following, a short overview of TBL's terminal and non-terminal symbols is given and the production rules to construct valid words of TBL are explained afterwards.

Before defining the TBL, some parameters that may be used for correct transformation into TBL are introduced. There can be three (configurable) parameters that affect the semantics of a TBL representation. The TBL may be time discrete, e.g. each motion symbol corresponds to a forward step in time. The sampling frequency, here called move time $\Delta T^{TBL}$, may have to be specified, and may define how long one particular move or every single move takes. The move time $\Delta T^{TBL}$ does not have to be equal to the sampling frequency of the spatio-temporal data, since data can be extra or interpolated with a configurable smoothing factor $\tau \in [0; 1]$ while being translated. Or in other words, for implementing the translation process, a smoothing factor $\tau \in [0; 1]$ might be used. If, for example, the time step in the spatio-temporal data is greater than the move time $\Delta T^{TBL}$ or some samples are lost, the TBL can smooth the movement to fit the actual behavior.

Furthermore, the TBL quantifies changes in velocity by multiplying the current speed with a constant factor, called velocity factor $\hat{v}$. It may be also used for deceleration.

The TBL grammar consists of variables according to Equation (1). These non-terminals are placeholders for symbols that are replaced via the production rules P by the terminal symbols (equation (2)) representing specific commands of TBL.

$$V = \{S, C, M, T, V, I, Q\} \quad (1)$$

$$\Sigma = \{f, r, l, t, b, *, +, ., -, \#, \backslash, /, p, h, v\} \quad (2)$$

The TBL grammar uses non-terminals V according to equation (1). The terminal symbols $\Sigma$ according to equation (2) represent specific commands of the TBL. Furthermore, helper terminal symbols $\Sigma_H$ may be needed for providing a valid syntax:

$$\Sigma_H = \{;,',',','(',')',\{',\'\}'\} \quad (3)$$

In addition, there are typical (floating point) numbers in the terminal alphabet.

The non-terminals may be grouped into production symbols, motion and turn symbols, and informational symbols as stated in the following first table:

| Non-terminal | Description |
| --- | --- |
| Production | |
| S | start non-terminal |
| C | specific symbol |
| Motion And Turn | |
| M | motion symbol |
| T | turn symbol |
| H | heading symbol |
| State | |
| V | velocity symbol |
| A | acceleration symbol |
| I | state information symbol |
| Q | quantifier/frequency descriptor symbol |

Production symbols may be used to construct a trajectory, where S may be the start symbol. Motion and turn symbols may describe changes in the appearance of the trajectory. The state symbols may change the internal state of an object, e.g. its current absolute velocity, its actual absolute position and heading, or inform about repetitions with the quantifier symbol.

The final symbols of a word w constructed by the grammar $G_{TBL}$ are the terminal symbols $\Sigma$ as stated in the following second table:

| Terminal | Command | Description |
| --- | --- | --- |
| Motion | | |
| 'f' | forward | move forward |
| 'r' | right | move in curve right |
| 'l' | left | move in curve left |
| 't' | top | move in curve up |
| 'b' | bottom | move in curve down |
| Quantification/ Frequency descriptor | | |
| '*' | very often | repetition very often |
| '+' | often | repetition often |
| '.' | normal | repetition normal |
| '-' | rare | repetition rare |
| '#' | very rare | repetition very rare |
| Acceleration | | |
| '\' | slow down | decrease velocity |
| '/' | speed up | increase velocity |

| Terminal | Command | Description |
|---|---|---|
| State information | | |
| 'p' | position | set actual position |
| 'h' | heading | set actual heading |
| 'v' | velocity | set actual velocity |
| Structural | | |
| '(',')' | symbol block | block/group of symbols |
| '{','}' | quantifier expression | indicate numeric quantifier |
| """" | comment block | adding comments |

The terminals are grouped in five groups: Motion symbols, quantification or frequency descriptor symbols, acceleration symbols, state information symbols and structural symbols. Motion symbols may describe a concrete movement, including a step in time. Motion symbols may be, for example:
f "forward with current speed"
r<d> "right movement by <d> degrees with current speed"
l<d> "left movement by <d> degrees with current speed"
t<d> "upward (top) movement by <d> degrees with current speed"
b<d> "downward (bottom) movement by <d> degrees with current speed"

Alternatively, instead of a rotation in degrees, a inverse curve radius (curvature) may be stated (l/r).

Quantification or frequency descriptor symbols may describe a relative repetition of blocks, or in other words, frequency descriptor symbols may state in a qualitative way how often something is repeated. Quantification or frequency descriptor symbols may be, for example:
(<S>){<r>} "<r> times repetition of symbols <S>"

Acceleration symbols may describe a change in the object's velocity, or in other words, change the object's velocity. Acceleration symbols may be, for example:
/ "acceleration of the current speed by a predetermined factor"
\ "deceleration of the current speed by a predetermined factor"

State information symbols may affect the internal state of an object used for trajectory reconstruction. Information symbols may be, for example:
p<x>,<y>,<z> "set position to <x>, <y>, <z>"
h<x>;<y>;<z> "set orientation vector to <x>, <y>, <z>"
v<v> "set current speed to <v>"

Alternatively, instead of Cartesian coordinates (x, y, z), geographical coordinates (longitude, latitude, height) may be used.

In some embodiments a symbol in TBL may correspond to a data item of the encoder 100 or the decoder 130, wherein the data item may comprise a syntax element, such as forward (f) or start (S), and a component value, such as <d>, <v> or <y>.

Productions may describe the syntax of the language. A non-terminal symbol on the left hand side may be replaced by symbols on the right hand side, which can be non-terminal or terminal symbols (Chomsky-2). The productions may be grouped for different purposes, which are explained in the following.

Subsequently, general rules, motion rules, velocity rules, informal rules and quantifier rules are introduced and described.

General rules may describe the start and further constructions of the TBL, respectively the trajectory. General rules or productions may be, for example:

$$S \rightarrow C|CS \quad (4)$$

$$C \rightarrow M|A|I|\text{"<string>"} \quad (5)$$

General productions or rules describe the constructs of the TBL. Thereby, an average trajectory may start with the symbol S which may be replaced by one or more symbols C according to equation (4).

According to equation (5), the non-terminal symbol C can be transformed, for example. into a symbol for motion M, acceleration A or state information I.

Quantifier rules may be used to advance the human readability and may be important for comparison. They may also compress the description for the same trajectories enormously. Quantifier rules or productions may be, for example:

$$C \rightarrow (S)\{<q>\}|(S)Q \quad (6)$$

$$Q \rightarrow \{<r>\} \quad (7)$$

$$Q \rightarrow *|+|.|-|\# \quad (8)$$

A quantifier may consists of parenthesized symbols S and a repetition indicator. The latter defines the number of repetitions that can either be a numeric constant <q> or a frequency descriptor Q, where Q is one of the frequency descriptors from the second table. The numeric constant is used for precise trajectories, whereas the frequency descriptors are better for generic trajectory patterns.

Rule or equation (6) describes the syntax of a quantifier. The quantifier may operate on the immediately preceding symbol S enclosed by braces. Rule or equation (7) specifies that S is repeated <r> times. Rule or equation (8) does the same for repetitions of the symbol S according to the second Table. The former rule is used for precise trajectories, the latter for comparison of precise trajectories with generic patterns.

Motion rules can describe productions to physical motion symbols of the object. Motion rules or productions may be, for example:

$$M \rightarrow f|T|T:Q|T:<q> \quad (9)$$

$$T \rightarrow H|H<d> \quad (10)$$

$$H \rightarrow r|l|t|b \quad (11)$$

Equation or rule (9) describes the primitive motion forward (f) or several types of motions. Motion productions describe physical motions of an object, either the primitive motion forward (f) or several types of turns T. In every time step, the object may perform a movement with its current velocity. A turn T is a heading change H with or without the attribute <d> that may specify the angular degree of the heading change. If <d> is missing, a default value may be assumed. H may be one of the following: right "r", left "l", top "t", or bottom "b". In other words, equation or rule (11) describes four possible turns: right (r), left (l), top (t) and bottom (b).

Also, T can be followed by a colon plus a frequency descriptor Q or a numeric constant <d>. In either case, the heading change may be the quotient of the angular degree divided by the quantifier Q or by <d>. For example "r180:2" describes half a 180° right turn, i.e. it is equivalent to "r90". The format is more useful to express curves when the exact turning rate is unknown. For example a hippodrome is written as "((f)−(r180:.).){2}". This trajectory starts with a few forward moves "(f)−" followed by a 180° degree turn that is split into a normal number of partial heading changes that are repeated a normal number of times to form a semi-circle "(r180:.).". The whole movement is repeated two times "{2}". Thereby, it is not "{<2>}". The < > in the productions of the grammar may indicate that a value is inserted.

In some embodiments there are three ways to specify motions with turning. First, motions can be expressed by a simple motion symbol according to equation (11), where a default value for the turning is assumed. Secondly, a motion is attributed. The attribute may be a special argument in the TBL grammar for parameterizing the degree of turn. The attribute <d> may specify the turning in form of a degree, i.e. the change of horizontal or vertical heading in one time step. The motion symbol with or without an attribute can be followed by a colon and the quantifier non-terminal Q. If the quantifier is given, the heading change may be the fragment given by the quantifier Q of the turning attribute. For example, T=r180: 2=r90 describes a half segment of a 180° right turn. As described later with a quantifier rules example, this may be useful to express circles without knowing the exact turning rate.

All motion terminals are quantizers, that means, for each symbol the object performs a time step and moves a distance according to its current velocity.

Acceleration rules or productions control the velocity of an object. Acceleration rules or productions may be, for example:

$$A \rightarrow /|\backslash \quad (12)$$

Equation or rule (12) controls the current velocity of an object. As the language is described in view of the objects behavior, two velocity operations may be defined: speed up (/) and slow down (\). The former increases the velocity by multiplying the current velocity by the velocity factor constant $\hat{v}$, the latter decreases the velocity by dividing the velocity by $\hat{v}$. The velocity change affects subsequent motions only. For example, in "/rf" the right and forward moves are done at the increased velocity, whereas in "r/f" the forward move is done faster than the right move.

State information or informal rules may be non-behavior rules. They may be only used for reconstructing the original trajectory from the behavior description. State information productions or rules may be, for example:

$$I \rightarrow p<x>,<y>,<z> \quad (13)$$

$$I \rightarrow h<x>,<y>,<z> \quad (14)$$

$$I \rightarrow v<v> \quad (15)$$

State information productions may change the internal state of an object. They may be only used for reconstructing the original trajectory from TBL and may be negligible for comparing trajectories. The current coordinates p<x>; <y>; <z> of the object on its trajectory are usually specified at the beginning of the trajectory and are updated whenever the reconstructed coordinates differ from the real position. Such a synchronization may be needed if symbols are lost in the transmission over a network or if an object reenters an observed area at a position that is different from where it has left. The same holds for the actual heading h<x>; <y>; <z> of an object and its initial velocity v<s>.

Or in other words, rule or equation (13) defines the coordinates of the object a trajectory is at the moment. It may be used at the beginning of the trajectory and may be updated whenever the coordinates reconstructed from the trajectory description differ from the real position, for example, when synchronization is needed, these might be useful in case symbols are lost while transmitting them over a network. Rule or equation (14) does the same for the actual heading of an object. Rule or equation (15) may be used to set the initial velocity and to update the velocity from time to time to keep it in sync with the object's real velocity.

In the following, an exemplary hippodrome trajectory shall be described with TBL. Thereby, the notation in TBL might be: T=((f)–(r180: .).) {2}. The hippodrome trajectory describes a short forward move "(f)-" followed by a 180° degree turn "r180" done in normal often steps "(r180:.)". The whole movement is repeated twice "( ){2}" resulting in a hippodrome figure.

Comments can be enclosed by ". They allow comments within the TBL or can be used to disable movement parts of a word ω in TBL:

$$C \rightarrow \text{"<string>"}$$

In TBL velocity changes might be represented as multiplying/dividing the velocity by a constant value. Whereas the velocity cannot be zero. For avoiding a special symbol for this situation, a threshold for the velocity may be introduced. If the velocity falls below this threshold, the object may be treated as to be standing. To phrase the hold of an object, a velocity symbol with argument zero may be emitted and moving in time may be represented as moving forward (f), resulting in no change of the position and heading of the object. If the velocity exceeds the threshold a speed up symbol may indicate that the velocity is now set back to the threshold level.

In the following, an exemplary standing still trajectory shall be described with TBL. In TBL the notation might be:
\f\fv0fff/f/f.

Here, the object slows down within two forward steps "\f\f" to a hold "v0", stays three time steps on this position "fff", and accelerates within two forward steps "/f/f" resulting again in a forward move.

If the heading information is available while standing still (for example, from inertial sensors), normal turn symbols may be emitted instead of the forward symbol.

If the object is moving in a 3D space and a vertical and a horizontal turn or change in heading is performed on one time step, then the motion with the larger direction change is stated first, e.g. if a horizontal change is larger than vertical change, only the horizontal change is done at the first step. The neglected horizontal or vertical shift is added to the next time step where again the larger change may be evaluated. Additionally, the comparison can be weighted to get better resolution in one plane.

Subsequently, synthetic trajectories and their corresponding spatio-temporal appearances are considered. Thereby, each plot consists of a xy-plane projection, a velocity profile and separated x, y, z coordinates over time.

Figure 5:
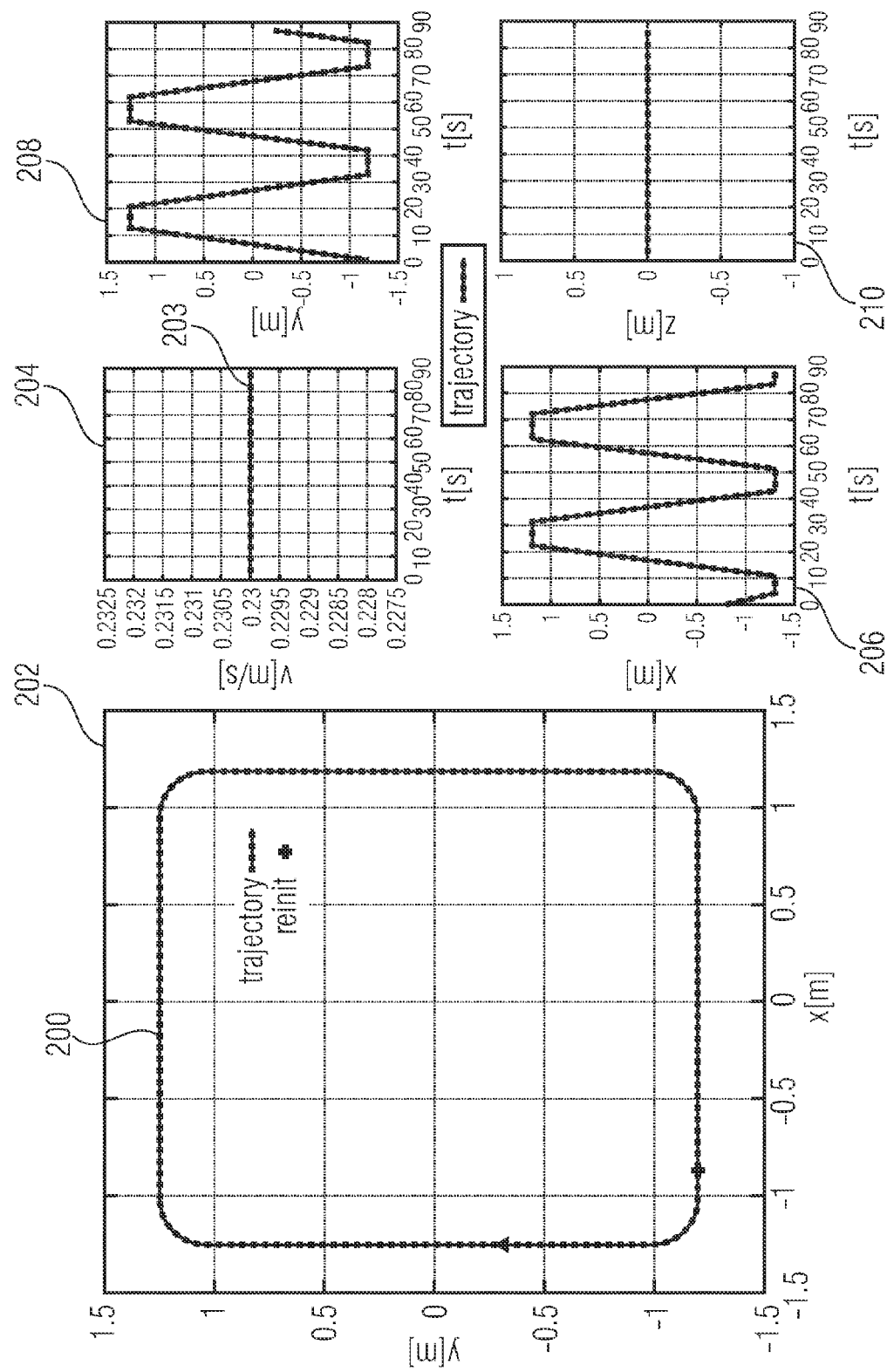
FIG. 5 shows a diagram of a synthetic trajectory and a corresponding spatio-temporal appearance.

FIG. 5 shows a diagram of a synthetic trajectory and a corresponding spatio-temporal appearance. Thereby, the trajectory 200 of the object is plotted in a xy-plane 202. Furthermore, a velocity profile 203 in meters per second (m/s) is plotted over time t in seconds (s) in a velocity plot 204. The x-component of the trajectory 200 in meters (m) is plotted over time t in seconds (s) in a x-component plot 206. The y-component of the trajectory 200 in meters (m) is plotted over time t in seconds (s) in a y-component plot 208. The z-component of the trajectory 200 in meters (m) is plotted over time t in seconds (s) in a z-component plot 210.

The trajectory shown in FIG. 5 is an exemplary train track of a miniature train. This an ideal reconstruction of a track recorded by the Institute for Integrated Circuits (11S) with the RTLS Witrack at the soccer stadium in Nuremberg. It consists of only forward moves and right curves at a constant velocity. The corresponding translated original spatio-temporal data is shown later on in FIG. 7. In TBL, the notation of the trajectory 200 shown in FIG. 5 might be:

```
"movetime=0.1,velocity_factor=1.1"
p −0.85, −1.2,0 h−1 ,0 ,0 v0.23
(f){8}
(
(r90:16){16}
(f){86}
){8}
(r90:16){16}
(f){30}
```

As stated above, first a move time and a velocity factor are defined. Then a start S (non-terminal) is defined, wherein the start S comprises a position p with the coordinates (−0.85, −1.2, 0), a heading h in direction (−1, 0, 0) and a velocity v of 0.23. Then, a forward move is performed 8 times, denoted by "(f) {8}". Afterwards, a 90° right turn is performed in 16 steps, denoted by "(r90:1 6) {1 6}". Next, a forward move is performed 86 times, denoted by "(f) {86}". The symbol ") {8}" denotes that the preceding right turn and the 86 forward moves are repeated 8 times. Afterwards, another 90° right turn is performed, denoted by "(r90:1 6) {1 6}", followed by 30 forward moves, denoted by "(f){30}".

Figure 6:
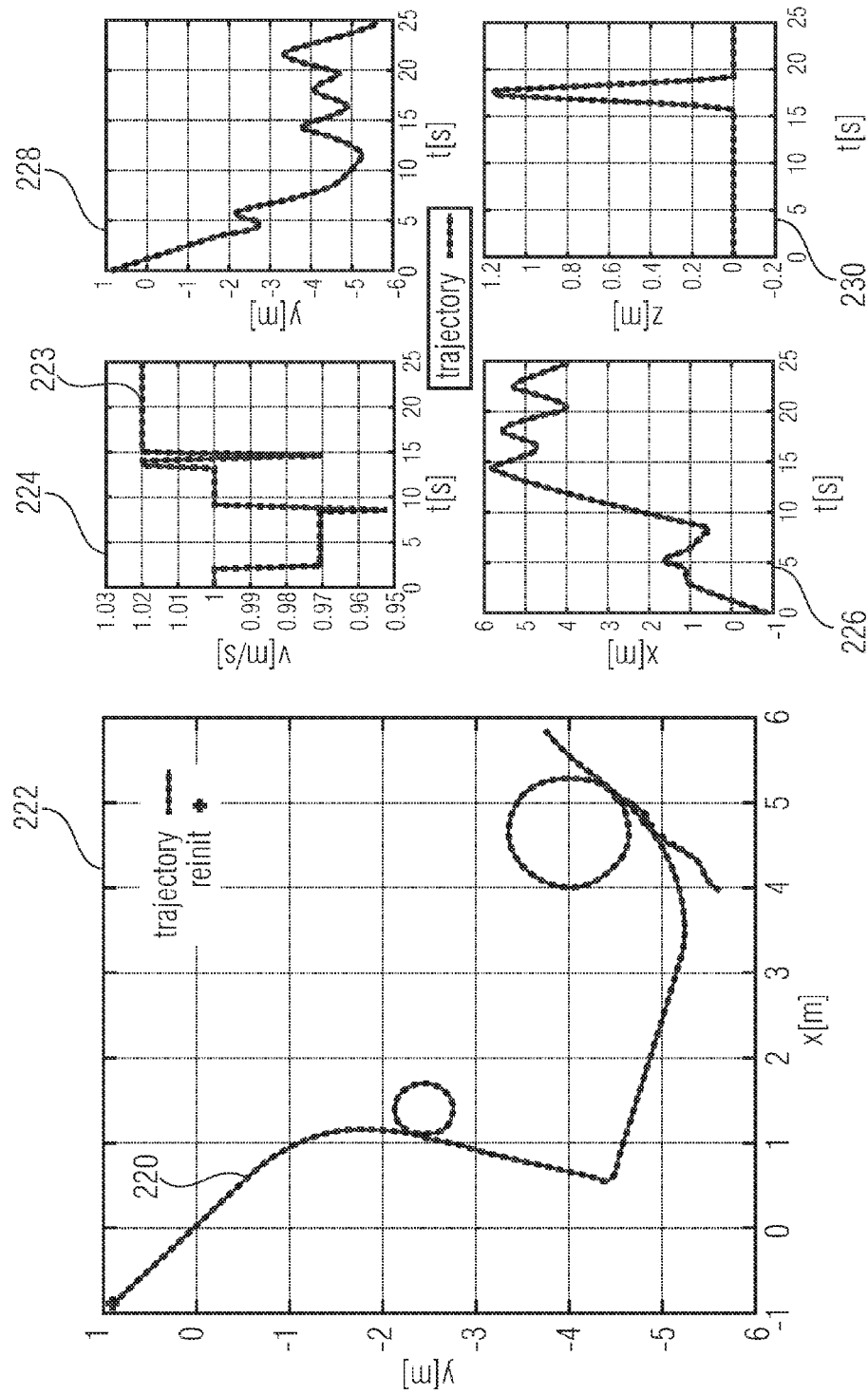
FIG. 6 shows a diagram of a synthetic trajectory and a corresponding spatio-temporal appearance.

FIG. 6 shows a diagram of a synthetic trajectory and a corresponding spatio-temporal appearance. Thereby, the trajectory 220 of the object is plotted in a xy-plane 222. Furthermore, a velocity profile 223 in meters per second (m/s) is plotted over time t in seconds (s) in a velocity plot 224. The x-component of the trajectory 200 in meters (m) is plotted over time t in seconds (s) in a x-component plot 226. The y-component of the trajectory 200 in meters (m) is plotted over time t in seconds (s) in a y-component plot 228. The z-component of the trajectory 200 in meters (m) is plotted over time t in seconds (s) in a z-component plot 230. In TBL, the notation of the trajectory 220 shown in FIG. 6 might be as follows:

| | |
|---|---|
| P −1 ,1 ,0 | "initialize starting" |
| v1 . 0 | " point, velocity and " |
| h1 , −1 ,0 | " heading south east " |
| ( f )+ | " forward " |
| ( f \ ) {3} | " forward and decelerate " |
| ( r3 )+ | " right curve " |
| (13 60 :+)+ | " full left circle " |
| ( f ) + ( f \ ) # 1 9 0 ( f / ) { 3 } ( / f ) # ( f )+ | "hard left " |
| f ( 13 )+ f | " left curve " |
| ( / f )# | " forward and accelerate" |
| ( f ) − ( f \ ) − 11 80 ( f / ) − ( f ) − | " bounce " |
| ( t 1 0 ){36} | " looping (10 degree up, 36 times)" |
| (r360 : * ) * | " full right circle in many steps " |
| ( 1 2 0 f r 2 0 f r 2 0 f 1 2 0 f )# | " some wiggling " |

Subsequently, a translation of spatio-temporal data into TBL is described, or in other words, an encoding of spatio-temporal data according to the concept of the present invention is described.

Classical RTLSs (RTLS=Real Time Location Systems) provide spatio-temporal data streams for each localized object, where the location's sampling frequency can be constant or variable. The data stream of an object providing the coordinates at each time step is called the object's trajectory.

Definition: Let $T_A$ be the trajectory of object A. The trajectory $T_A = (L_{t0}, L_{t1}, \ldots ; L_T)$ is the time series of the object's locations $L_t$ with $L_t=(x_t, y_t, z_t)$ is the location in 3D space at time t and T is the time at the final location of the object.

The herein presented transformation method generates the trajectory description in TBL from a spatio-temporal data stream. The TBL may be defined in a strict time discrete way, where $\Delta T$ (or $\Delta T^{TBL}$) is the constant move time or sampling time.

Definition: Let $\omega_A$ be a word of $G_{TBL}$ that describes the trajectory of object A. The word $\omega_A$ is the series of symbols $c_i$ that express the object's trajectory, where $\omega_A=(c_0, c_1, \ldots, c_n)$, i.e. that the word $\omega_A$ has the length n. The transformation $F_{TBL}: T_A \rightarrow \omega_A$ transforms the trajectory $T_A$ into the word $\omega_A$.

In the following, one method for transforming a trajectory $T_A$ into the corresponding word $\omega_A$ of TBL that can be applied online is presented. Since $t_T \neq t_{T-1} + \Delta T$ for the most cases, a time scaling factor $\lambda$ may be needed, i.e. a multiplication factor for $\Delta T$, with T being the time of the current location and T' the time of the previous symbols $(c_0, \ldots, c_{n-1})$:

$$\lambda_T = \frac{T - T'}{\Delta T} \quad (16)$$

At the beginning of the trajectory, the informal symbols of the trajectory may have to be set to the starting location $(c_0=p(L_0))$, the initial heading $(c_1=h(\vec{v}_1))$, and the velocity $(c_2=v(|\vec{v}_1|))$. The staring location of cause $L_0$, the first location of the trajectory. As soon as the second location $L_1$ becomes available, the velocity $\vec{v}_T$ and heading $\vec{h}_T$ are calculated according to Equation (17) and Equation (18), followed by a forward symbol $(c_3=f)$.

$$\vec{v}_T = \frac{L_T - L_{T-1}}{\Delta T \cdot \lambda_T} \quad (17)$$

$$\vec{h}_T = \frac{\vec{v}_T}{|\vec{v}_T|} \quad (18)$$

For each location $L_T$ with T>1, the velocity multiplication factor vmult may be calculated and the symbol $C_{V,T}$ for a velocity change ("/", "\" or nothing) may be inserted if |vmult| is larger than one. For |vmult|≥2 the symbol may be repeated via the quantifier rule ("$(c_{V,T})$\{|vmult|\}").

$$vmult = \log_v \frac{v_T}{v_{T-1}} \quad (19)$$

$$c_{V,T} = \begin{cases} \text{"/"} & vmult > 1 \\ \text{"\textbackslash"} & vmult < 1 \\ \emptyset & else \end{cases} \quad (20)$$

After the velocity change symbol, the motion symbol $c_{M,T}$ may be determined. Therefore, the horizontal heading change $\Delta_{\phi T}$ and the vertical heading change $\Delta_{\sigma T}$ are calculated. Since the time steps in TBL and $T_A$ can differ, the time factor may be smoothed by the smoothing factor $\tau=]0 \ldots 1]$.

$$\varphi_T = \arctan \frac{h_T \cdot y}{h_T \cdot x} \quad (21)$$

$$\sigma_T = \arctan \frac{h_T \cdot z}{|h_t \cdot \vec{x}y|} \quad (22)$$

-continued $$\Delta\varphi_{T'} = \frac{\varphi_T - \varphi_{T'-1}}{\lambda^T} \quad (23)$$

$$\Delta\sigma_{T'} = \frac{\sigma_T - \sigma_{T'-1}}{\lambda^T} \quad (24)$$

Afterwards, the motion symbol $c_{M,T}$ may be selected according to Equation (25):

$$c_{M,T'} = \begin{cases} \text{``}r\Delta\varphi_T\text{''} & \Delta\varphi_T < 0 \text{ and } |\Delta\sigma_T| < |\Delta\varphi_T| \\ \text{``}l\Delta\varphi_T\text{''} & \Delta\varphi_T > 0 \text{ and } |\Delta\sigma_T| < |\Delta\varphi_T| \\ \text{``}f\text{''} & \Delta\varphi_T = 0 \text{ and } \Delta\sigma_T = 0 \\ \text{``}b\Delta\sigma_T\text{''} & \Delta\sigma_T < 0 \text{ and } |\Delta\sigma_T| > |\Delta\varphi_T| \\ \text{``}t\Delta\sigma_T\text{''} & \Delta\sigma_T > 0 \text{ and } |\Delta\sigma_T| > |\Delta\varphi_T| \end{cases} \quad (25)$$

After each motion symbol, the TBL heading $\phi_{T'}$ and $\sigma_{\sigma'}$ may be recalculated according to the determined symbols and the current time T' is incremented by $\Delta T$. The velocity and motion symbols may be determined as long as the current TBL time T' is less than the current location time T. If T'>T the next sample may be considered and T may be set to the sampling time of the next location.

In the following, an alternative embodiment of a translation of spatio-temporal data into TBL is described, or in other words, an encoding of spatio-temporal data according to the concept of the present invention is described.

RTLS (RTLS=Real Time Location Systems) usually provide spatio-temporal data streams of object coordinates with a constant or variable sampling frequency. Formally, $T_A = (L_0, L_1, \ldots, L_{n-1})$ may be the trajectory of object A with length n. $L_k$ may be the object's position in 3D space, i.e. $L_k = (x_k, y_k, z_k)$ for sample $k \in [0; n]_N$ at the sampling time $t_k$.

Subsequently, an online transformation to generate the trajectory description in TBL from a spatio-temporal data stream is presented. The TBL encoding may use a strict time discrete way, where $\Delta t^{TBL}$ may be the constant move time in the TBL domain. Formally, $\omega_A$ may be a word in $L(G_{TBL})$ that describes the trajectory of the object A. The word $\omega_A = (c_0, c_1, \ldots, c_{m-1})$ may be the series of symbols that express the object's trajectory for $i \in [0; m]_N$ and the corresponding TBL time $t_i^{TBL}$. Each $c_i$ may be a sequence of several terminals from $\Sigma_{TBL}$. The transformation $F_{TBL}: T_A \rightarrow \omega_A$ transforms the trajectory $T_A$ into the word $\omega_A$. Thereby, $t_i$ refers to the time of the symbol $c_i$ in the TBL domain whereas subscript k refers to time stamps of the original trajectory.

The transformation $F_{TBL}$ internally may use several variables to store the state of the trajectory as it may be reconstructed from the TBL domain. $L_i^{TBL}$ is the reconstructed location after a move $c_i$ has been performed. Similar for the velocity $v_i^{TBL}$ and the headings $\phi_i^{TBL}$ and $\sigma_i^{TBL}$.

The $F_{TBL}$ algorithm comprises the following steps. In a first step, the initial symbols are calculated. In a second step, velocity changes plus motions are determined and the internal variables are recalculated. In a third step, $t_i^{TBL}$ is incremented by $\Delta t^{TBL}$. The time stamp $t_i^{TBL}$ is in the TBL domain for which a symbol may be emitted. Hence, earlier locations $L_k$ of the original trajectory ($t_k < t_i^{TBL}$) may be skipped. In a forth step, as long as the end of $T_A$ has not been reached, the algorithm continues with the second step. Thereby, $t_k \geq t_i^{TBL}$ may hold due to the third step.

Since, in general, the spatio-temporal sampling period may not be equal to the move time in the TBL (i.e. $t_k - t_{k-1} \neq \Delta t^{TBL}$), a time scaling factor $\lambda_i$ may be introduced for the symbol $c_i$, that might be a multiplication factor for $\Delta t^{TBL}$. The factor $\lambda_i$ may be the difference between the current sample time $t_k$ and the previous time $t_{i-1}^{TBL}$ in the TBL domain in relation to the TBL's move time $\Delta t^{TBL}$:

$$\lambda_i = \frac{t_k - t_{i-1}}{\Delta t^{TBL}}$$

At the beginning of the trajectory, $F_{TBL}$ may construct the symbols $c_0$ that encode the starting location, $c_0 = \text{``}p\langle L_{0,x}\rangle, \langle L_{0,y}\rangle, \langle L_{0,z}\rangle\text{''}$. The internal TBL location $L_0^{TBL}$ may be set to $L_0$, the first location of a given trajectory.

As soon as a second location $L_1$ becomes available, $F_{TBL}$ may work on the symbols for $c_1$ which might be the concatenation of three parts: a velocity description $c_1^v$, a heading description $c_1^H$, and a subsequent "f" to specify a forward move.

For $c_1^v$ a velocity vector $\vec{v}_i$ and a heading vector $\vec{h}_i$, can be calculated (for k=1 and i=1) according to:

$$\vec{v}_i = \frac{L_k - L_{i-1}^{TBL}}{\Delta t^{TBL} \cdot \lambda_i} \quad \vec{h}_i = \frac{\vec{v}_i}{|\vec{v}_i|}$$

With that, $c_1^v$ may be "$v\langle |\vec{v}_1|\rangle$". The initial heading $c_1^H$ may be "$h\langle h_{1,x}\rangle, \langle h_{1,y}\rangle, \langle h_{1,z}\rangle$".

For every location $L_k$ that follows in the trajectory, $F_{TBL}$ may increment i and may determine the symbols that encode the velocity change $c_i^A$ and the motion type $c_i^M$. The velocity change $c_i^A$ may depend on vmult:

$$vmult = \log_v \frac{|\vec{v}_i|}{|\vec{v}_{i-1}|}$$

Based on vmult, $c_i^A$ may be constructed as follows:

$$c_i^A = \begin{cases} \text{``/''} & vmult > 1 \\ \text{``\textbackslash''} & vmult < 1 \\ \varepsilon & \text{else} \end{cases}$$

If there might be a significant change of speed ($|vmult| \geq 2$), a single "/" or "\" can be insufficient. Therefore, $c_i^A$ may be extended with a quantifier:

$$c_i^{A*} = \text{``}(\langle c_i^A\rangle)\{\langle vmult|\rangle\}\text{''}$$

For the motion symbol $c_i^M$, $F_{TBL}$ can calculate the current horizontal $\phi_i$ and vertical heading $\sigma_i$:

$$\varphi_i = \arctan\frac{h_{i,y}}{h_{i,x}} \quad \sigma_i = \arctan\frac{h_{i,z}}{|h_{i,xy}|}$$

Next, $F_{TBL}$ may calculate the horizontal heading change $\Delta\phi_i^{TBL}$ and the vertical heading change $\Delta\sigma_i^{TBL}$ based, for example, on the internal heading values $\phi_{i-1}^{TBL}$ and $\sigma_{i-1}^{TBL}$. For $\lambda_i > 1$, i.e. if the sampling time is above the TBL move time, $F_{TBL}$ may scale the heading change accordingly. Since the heading change cannot be scaled linearly with respect to $\lambda_i$, $\lambda_i$ may be raised to the power of $\tau \in [0; 1]_R$. Hence, for larger $\lambda_i$ there is a smaller scaling of $\Delta\phi_i^{TBL}$ and $\Delta\sigma_i^{TBL}$. The configuration parameter τ sets the "smoothness" of the resulting trajectory. It can range from zero (for no scaling at all, rough edges) to 1 (smooth):

$$\Delta\varphi_i^{TBL} = \frac{\varphi_i - \varphi_{i-1}^{TBL}}{\lambda_i^{\tau}} \quad \Delta\sigma_i^{TBL} = \frac{\sigma_i - \sigma_{i-1}^{TBL}}{\lambda_i^{\tau}}$$

After these preparations, $F_{TBL}$ constructs $c_i^M =$ $$\begin{cases} "r\langle\Delta\varphi_i^{TBL}\rangle" & \Delta\varphi_i^{TBL} < 0 \land |\Delta\sigma_i^{TBL}| < |\Delta\varphi_i^{TBL}| \\ "l\langle\Delta\varphi_i^{TBL}\rangle" & \Delta\varphi_i^{TBL} > 0 \land |\Delta\sigma_i^{TBL}| < |\Delta\varphi_i^{TBL}| \\ "f" & \Delta\varphi_i^{TBL} = 0 \land \Delta\sigma_i^{TBL} = 0 \\ "b\langle\Delta\sigma_i^{TBL}\rangle" & \Delta\sigma_i^{TBL} < 0 \land |\Delta\sigma_i^{TBL}| > |\Delta\varphi_i^{TBL}| \\ "t\langle\Delta\sigma_i^{TBL}\rangle" & \Delta\sigma_i^{TBL} > 0 \land |\Delta\sigma_i^{TBL}| > |\Delta\varphi_i^{TBL}| \end{cases}$$

Thereby, the comparison of $\Delta\phi_i^{TBL}$ and $\Delta\sigma_i^{TBL}$ can be weighted to favor one direction, e.g. for reducing the translation error in this (selected) direction. Finally, after emitting $c_i^A$ (if not ϵ) and $c_i^M$, $F_{TBL}$ may recalculate $\phi_i^{TBL}$, $\sigma_i^{TBL}$, $v_i^{TBL}$, and $L_i^{TBL}$.

It is obvious that $F_{TBL}$ can only construct valid words $\omega_{T_4}$ that are in $L(G_{TBL})$ and that also conform to the additional restrictions already discussed above.

Figure 7:
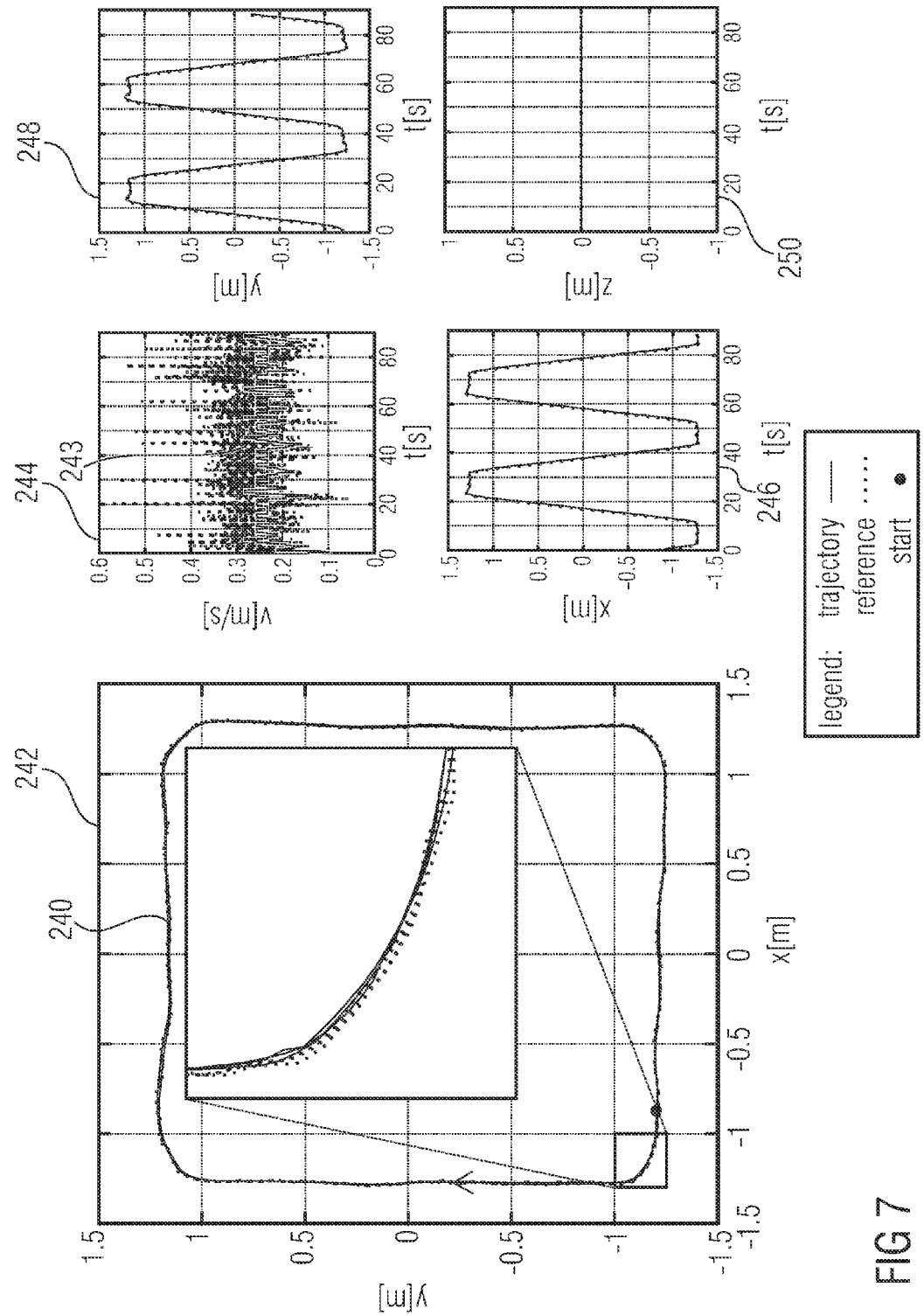
FIG. 7 shows a diagram of a trajectory and a corresponding spatio-temporal appearance.

FIG. 7 depicts the real captured trajectory of the formerly shown miniature train synthetic trajectory, translated into TBL. Or in other words, FIG. 7 shows the first part of a TBL description generated from a real captured trajectory of a miniature train. It also shows the reconstructed and the original trajectory (dotted line) as a spatio-temporal visualization. In TBL, the notation of the trajectory 240 shown in FIG. 7 might be:
p-0.859,-1.201,0h-0.99763,0.0688005,0v0.144813f
l10.5882V4.94118(\){3}r0.705882r0.705882/f
r2.11765/r2.11765r2.82353(/){6}11.41176fr2.82353
fr2.11765r2.11765r2.82353\r3.52941r1.41176
. . . .

Thereby, the translated TBL trajectory has a turning resolution of 8 bit and horizontal movements are advantageous by means of a weight factor of 2. Moreover, the trajectory 240 of the object is plotted in a xy-plane 242. Furthermore, a velocity profile 243 in meters per second (m/s) is plotted over time t in seconds (s) in a velocity plot 244. The x-component of the trajectory 240 in meters (m) is plotted over time t in seconds (s) in a x-component plot 246. The y-component of the trajectory 240 in meters (m) is plotted over time t in seconds (s) in a y-component plot 248. The z-component of the trajectory 240 in meters (m) is plotted over time t in seconds (s) in a z-component plot 250.

The data were taken at the soccer station in Nuremberg with the Witrack RTLS developed at the IIS for performance tests. The translated locations have a standard deviation of $2 \cdot 10^{-3}$ m, mainly caused by the velocity quantification and turning resolution of 16 bit.

The reconstructed trajectory is a very close match to the original one, as depicted in FIG. 7 in the inset that is a zoom in on the left lower corner. Only the velocity plot shows moderately higher deviation, since the velocity is quantified by TBL. Altogether, the reconstructed positions have a standard deviation of 2 mm in relation to its originals.

Assumed that the original trajectory is stored in double values for x and y, the 885 samples of the example above thus take 13.8 Kbyte. The uncompressed TBL representation encoded as a string may need 6.0 Kbyte (−56:5%). Another 10:0% can be saved (for the example above) if repeated segments in the trajectory are detected and encoded as it will be discussed in the below embodiments.

The herein proposed transformation method is able to transform a given trajectory into the corresponding TBL description. Since each time step has only one symbol for each direction change (horizontal/vertical), the TBL transformation may insert an error in three dimensional space. In most situations, the z-coordinate may be irrelevant. This is the case, for example, when goods are tracked in warehouses. The goods are almost carried at the same height and only moved upward or downward while inclusion.

The transformation algorithm $F_{TBL}$ described in the above embodiments may not detect repeated segments. This may be done in a second stage, a TBL-to-TBL transformation. A repeated segment may be a substring of a TBL trajectory that can be aggregated by means of a quantifier. For example, in "frlll" the three "l" symbols can be expressed as the aggregate "(l){3}". A subrepetition may occur within another aggregate, i.e. the repetition is part of the repeated segment of the enclosing repetition, e.g. in "frlllfrlll" which can be expressed as "(fr(l){3}){2}" the subrepetition "(l){3}" is part of the enclosing repetition. Thereby, "ll" is not a subrepetition of "lll", since it is not part of aggregate "(l){3}".

Since, in general, a TBL string may contain several repetitions that can overlap, there are several ways to aggregate that string. A repetition detecting and encoding algorithm has to be adapted or configured to find a (best) combination of aggregates that can either increase (or maximize) the readability or yield a hight (or highest) compression rate. Moreover, RTLS (Real Time Location System) may require an algorithm with realtime (online) capabilities.

In some embodiments, the repetition detection and encoding algorithm according to the concept of the present invention may use a sliding window. The sliding window may introduce a limited latency (that depends on the size of the window) and may restrict the detection capabilitys to repetitions that completely fit into the sliding window. Thereby, the repetition detection and encoding algorithm according to the concept of the present invention provides realtime capabilities.

In some embodiments, the repetition detection and encoding is perfomed in three steps. In a first step, all possible repetitions inside the sliding window are found. In a second step, the (best) combination of aggregates is determined. In a third step, the oldest symbol or aggregation is pushed out of the window.

For finding repetitions, the following first algorithm may be used:

---

Input : Sliding window of TBL symbols sw
Result: List of repetitions R with their subrepetitons $S_R$
1    for size ← 1 to sizeof(sw)/2 do
2        for offset ← size to sizeof(sw) step size do
3            if sw(1 to size) = sw(offset + 1 to offset + size)
            then
4                R ← Repetition(start = 1, end = offset + size, size = size);
5                $S_R$ ← SubrepsInRightmostSegment(R);
6                store R and its SR ;
7            else
8                continue with next size;

---

Figure 8:
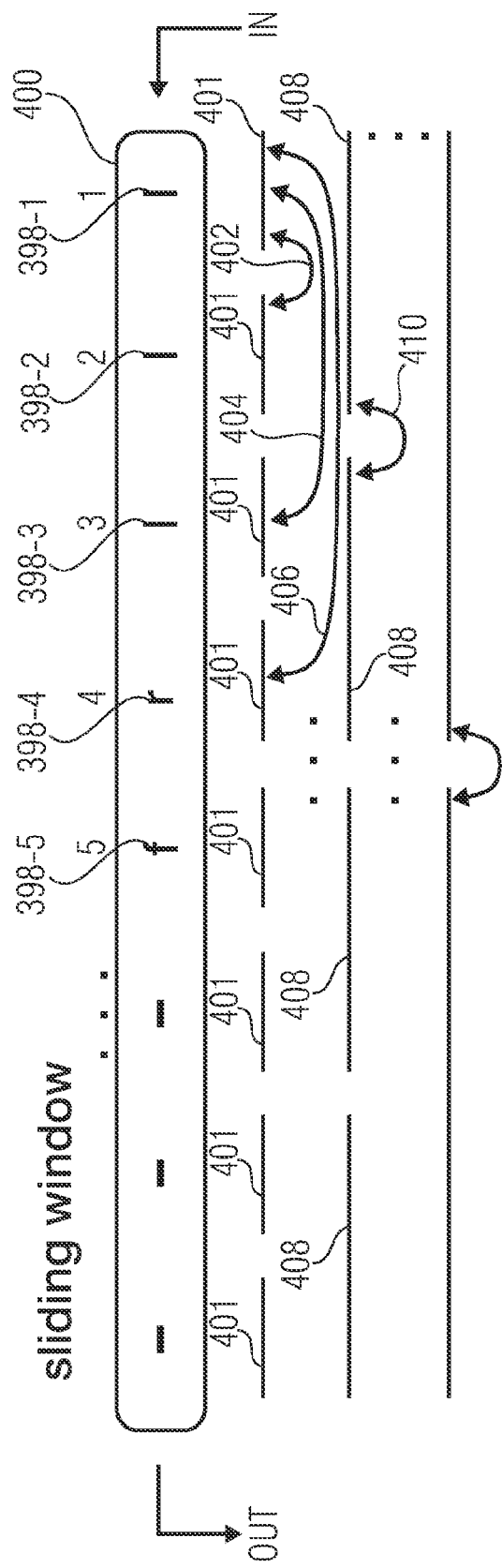
FIG. 8 shows a diagram of a working principle of a algorithm for finding repetitions.

Whenever a new symbol $c_i$ of a TBL data stream is queued into the sliding window sw, the first algorithm may search for repetitions that become available due to the new symbol. For growing values of size, the algorithm may compare the rightmost size symbols to the rest of the sliding window. Segments of length size are compared as long as they match (lines 1-3, 8). FIG. 8 shows a diagram of the working principle of the algorithm for finding repetitions. In FIG. 8, the rightmost segment of size 1 (denoted in FIG. 8 by the referential numeral 401) matches two times 402 (for the symbols 398_1 and 398_2) and 404 (for the symbols 398_1 and 398_3) and fails on the third 406 for the symbol 398_3. In the next iteration for size 2 (denoted in FIG. 8 by the referential numeral 408), already the first comparison 410 may fail. The same may hold for larger values of size. For every match, a corresponding repetition R can be created (line 4) and can be stored in a global list (line 6).

For simplicity reasons, it is not shown in the pseudo-code that the position information of all the repetitions stored in the global list may be updated (for example, shifted to the left) whenever symbols are pushed into and out of the window 400. After a while, the global list may point to repetitions that are either buried somewhere within the window 400 or to other repetitions that also start at the right hand side but that are shorter than the newly found R. Hence, whenever a new R is inserted into the global list, the algorithm can inspect the global list to find all subrepetitions $S_R$ that are within R.

Figure 9:
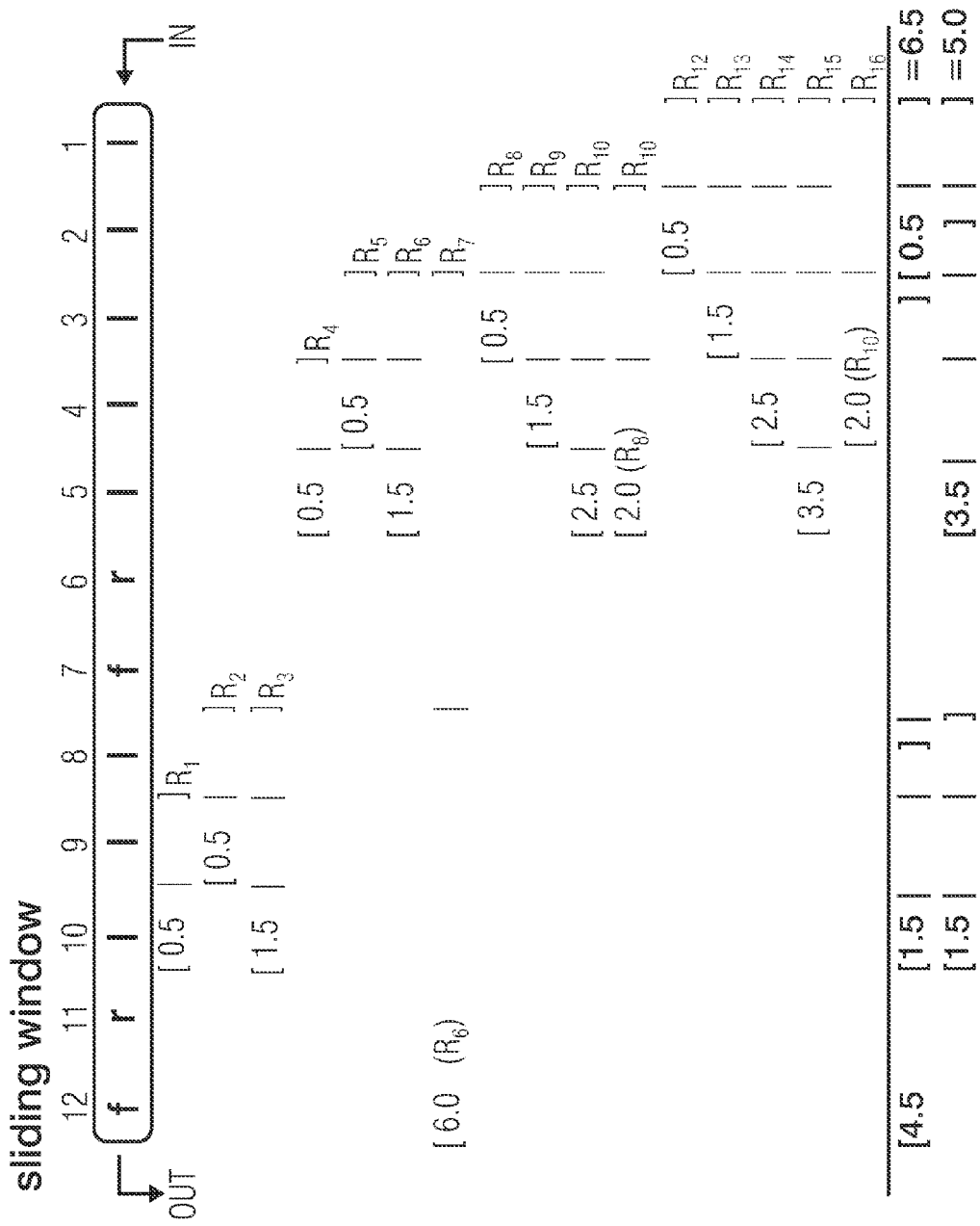
FIG. 9 shows a diagram of repetitions and their gains.

In the example, the sliding window 400 started empty. When the first symbol "f" 398_5 is pushed in, nothing can be compared. With the second symbol "r" (398_4) the sliding window 400 contains " - - - f r" and the algorithm compares "r" (398_4) to "f" (398_5). The first match is found only after the two symbols "ll" (398_2 and 398_3) have been inserted. The window 400 then contains "–f r l l", and the first repetition $R_1$ is found for "ll" (398_2 and 398_3), namely "–f r $[l|l]_{R_1}$" (thereby, square brackets indicate the start and end of the symbols that can be aggregated, vertical lines separate repeated segments). When the third "l" (398_1) is pushed in, the previous repetition $R_1$ is updated, i.e. shifted to the left by one position. Due to the new "l" (398_1), two new repetitions become available: "f r l $[l|l]_{R_2}$" and "f r $[l|l|l]_{R_3}$". $R_1$ is not a subrepetition of $R_3$, since it does not fit into the repeated segment ("l") of $R_3$. Assumed that the sequence "frlll" is again pushed into the window 400 (for example, as shown in FIG. 9, wherein the rightmost two "l" symbols should be ignored for the present embodiment), the repetitions $R_4 \ldots _6$ are similar to $R_1 \ldots _3$. In addition, $R_7$="[f r l l l|f r l l l]" is found. Since only $R_4 \ldots _6$ are part of the rightmost instance of the repeated segment of $R_7$, they are the subrepetitions of $R_7$.

The goal of this step may be to find an aggregation of repetitions that yields an increased (or best) readability or increased (or maximal) reduction of symbols. A enhanced (or best) arrangement may be determined by calculating a potential gain for each repetition and by then searching for a high (or highest) gain of possible combinations of repetitions. Next, a repetition R is considered. It may have a segment of length $l_R$ symbols that appears $x_R$ times in R so that R may have an overall length of $s_R = x_R \cdot l_R$. When R is aggregated, $s_R - l_R$ symbols can be saved, but the overhead $o_q = 5$ for the qualifier symbols "( . . . ){⟨$x_R$⟩}" has to be taken into account, since the parentheses, the curly brackets, and $x_R$ may add five additional symbols (for simplicity it may be assumed that $x_R$<10. The correct value may be $o_q = 5 + \log_{10} x_R$ if all nonterminal symbols have an encoding length of 1).

Hence, for repetitions without subrepetitions the gain may be:

$$g_R = s_R - l_R - o_q$$

Only for $g_R > 0$ aggregation might be beneficial.

In the example for $R_3$=[l|l|l], $s_R$=3, $l_R$=1 and therefore $g_{R_3}$=3−1−5=−3<0. Since the string "(l){3}" is longer than "lll" by three symbols, it may not be beneficial for compression to turn the string into an aggregate. Nevertheless, "(l){3}" does improve the readability. Thus, when optimizing for readability instead of compression, a fixed $o_q$=0.5 may be used to make sure that every single repetition, no matter how small it is, has a positive gain and is therefore expressed by a quantifier ($g_{R_3}$'=3−1−0.5=1.5>0 for "(l){3}").

Next, a repetition R that has a few subrepetitions $S_R$ within the repeated segment of length l is considered. If that is the case, then the subrepetitions themselves can be expressed as aggregates and further add to the combined gain $g^*_R$. Hence, the enhanced (or optimal) combined gain of a repetition R may be:

$$g^*_R = g_R + \max_{\substack{S \subseteq S_R \wedge \\ S \text{ non overlapping}}} \left(0, \sum_{\rho \in S} g^*_\rho\right).$$

In some embodiments, for computing the enhanced (or optimal) gains of the subrepetitions, the same recursive idea may apply.

FIG. 9 shows a diagram of repetitions and their gains. In FIG. 9, $R_7$ has three subrepetitions $R_4 \ldots _6$. To find the enhanced (or optimal) gain, the power set of all the subrepetitions may be considered, but restricted to those that might not overlap. In the example, from the 7 non-empty sets in the power set (all combinations of $R_4 \ldots _6$) only the three one-element sets {$R_4$} . . . {$R_5$} are free of overlaps. Their respective gain is $g^*_{R_4} = g^*_{R_5}$=0.5 and $g^*_{R_6}$=1.5. Hence, the best gain for $R_7$ can be achieved if the maximal gain that can be achieved by aggregating all non-overlapping combinations of its subrepetitions is added. Since $g_{R_7}$=10−5−0.5=4.5 ($o_q$=0.5) and since the maximum of the g*-values of the three sets is 1.5, $g^*_{R_7}$=4.5+0.5=6. FIG. 9 gives the $g^*_R$-values of all repetitions inside the brackets, the contribution of subrepetitions is mentioned where applicable. For simplicity reasons, FIG. 9 shows a special case. In general, the sets may have more than one element. In that case, more than one subrepetition may be turned into an aggregate at the same time. For example, a repetition with the repeated segment "frfrlll" is considered. Obviously, there may be two non-overlapping subrepetitions "[f r|f r]" and "[l|l|l]" that both can be turned into aggregates, whose gains add up.

The following second algorithm takes a repetition R and its subrepetitions $S_R$ and computes the enhanced (or optimal) combined gain $g^*_R$:

```
Input : Repetition R and its subrepetitions S_R
1    gain (R, S_R) = s_R − l_R − o_q + subgain (R, S_R);
2    subgain (R, S_R):
3    begin
4       gmax = 0;
5       foreach ρ in S_R do
6          g = gain (ρ, S_ρ)
7              + subgain (R | _ρ, S_R | _ρ);
8          g_max = max (g, g_max)
9       return g_max;
10   end
```

The foreach loop may compute the power set by a systematic sweep through the subrepetitions. It may take one of the subrepetitions, such as ρ, and recursively computes the optimal gain (line 6) that can be achieved for it and its subrepetitions $S_\rho$. In the above R="frfrlll" example, the algorithm may first compute the enhanced (or optimal) gain of the subrepetition "lll". It may have to add whatever can be contributed by the rest of R (line 7). To do so, the algorithm may restrict R to what is left after ρ is taken away. Here, R|_ρ is "rfrf". Similarly, the set of subrepetitions is restricted to what is left after ρ has been selected: these are the subrepetitions that may not overlap with ρ and that may be within R|_ρ. Less formally, line 7 considers both, the symbols and the subrepetitions that are on the left side of ρ. This of course is recursive again, since in general there might be more than just one subrepetition within that remainder of R. Since the foreach loop may treat every subrepetition in $S_R$ in that way, the algorithm can enumerate the power set and can find a enhanced (or best possible) gain of all combinations of subrepetitions that cover R.

Next, $R_7$ is considered. The algorithm may pick one of the three subrepetitions $R_{4...6}$ in turn. For each of the subrepetitions, the enhanced (or optimal) gain is computed in line 6. If $R_7$ is restricted with respect to one of these $R_i$, it will be either "fr" or "frl". Restricting the set of subrepetitions may yield the empty set, so that the enhanced (or optimal) gain may be $g_{max}$=max(0.5,0.5,1.5).

The second algorithm cannot only be used to compute the enhanced (or optimal) gain of a repetition. It can also be used to determine the enhanced (or optimal) gain available in the sliding window. For that purpose, it may have to be started with R=sw.

Assumed that the foreach processes the repetitions backwards. Then the foreach loop may considers $R_{16}$ first (since $R_{16}$ has a subrepetition $R_{12}$, the total gain of $R_{16}$ is 2). In line 7, the algorithm recursively dives into the rest of the window. It my study sw[12:5] with the set of the three repetitions $R_{1...3}$. The maximal value among those is 1.5. The total gain of this arrangement is 1.5+2=3.5.

The foreach may try many combinations. Among those are the two that are shown in the bottom lines of FIG. 9. For the first of the result lines, the foreach has considered $R_{12}$. The rest of the window sw[12:3] holds the repetitions $R_{1...7}$. The recursive call in line 7 may detect that $R_7$ (with the appropriate sub-aggregate) may return the best gain, as already discussed above. Hence, the final readability-gain for this case is 6.5. The enhanced (or best) encoding is "(fr(l){3}){2}(l){2}". The last line in FIG. 9 shows the 2nd best aggregation found: $R_3$ and $R_{15}$ are used for the aggregation "fr(l){3}fr(l){5}".

As soon as the sliding window is full and the optimal aggregation has been computed, the leftmost symbol may be written to the output and replaced by a "–". If the leftmost symbol is part of an aggregation found in step 2, the whole aggregate may be written to the output and all positions that become vacant can be replaced, for example, by dashes.

In FIG. 9, the leftmost "f" belongs to the optimal aggregation (gain 6.5). So the first 10 slots of the window are output. If the last line of FIG. 9 had been the optimal solution, only one "f" had been emitted.

Afterwards all slots of the sliding window (conceptually) may be shifted to the left by one slot. The positions of all repetitions may be updated in the global list (and their subrepetitions) that still correspond to symbols in the window. Repetitions from the list that contain symbols that have been emitted may be purged.

Then, the detection process may start over by pushing in the next input symbol. For many applications, e.g. for trajectory similarity reasoning, the information symbols ("p", "h", and "v") can be skipped and filtered out by this TBL-to-TBL-transformation.

In the following, a matching of trajectories shall be described. One aspect of TBL is that it allows representing trajectories in a descriptive way. Therefore, there is no need to rotate or translate the trajectory before it could be compared to a similar one. For example, "(f){10}" may be very similar to "(0{5}r0.5(f){4}". In spite of calculating point distances, for example, Euclidean distances for each trajectory point, there is only the need to compare symbols and search for insertions or deletions. Also known as the Edit Distance (ED) problem.

A simple ED-algorithm using dynamic programming is known as the levenshtein distance. Since the TBL has related symbols, the levenshtein distance may not be applied directly. For example, symbols "f" and "r5" are related symbols with a distance of 5 degree. Therefore, the algorithm may be adapted and the weights for substitution, insertion and deletion may be changed. A symbol might be substituted by the distance of the symbols. The penalty for deletion or insertion might be set to the highest symbol distance, which is 180 degree.

An adapted levenshtein algorithm might be denoted as follows:

```
INPUT: Trajectories T_A, T_B
OUTPUT: Distance T_A(1 ... m), T_B(1 ... n)
MAX_DIST <- 180
for i from 0 to m
    d(i, 0) <- i * MAX_DIST
for j from 0 to n
    d(0, j) <- j * MAX_DIST
for j from 1 to m
    for i from 1 to n
        d(i, j) <- minimum(
            d(i-1, j) * MAX_DIST,
            d(i, j-1) * MAX_DIST,
            d(i-1, j-1) * distance(T_A(i),
                                    T_B(j))
        )
return d(m, n)
```

The above stated algorithm may return a weight for the similarity of two trajectories. Where the weight can be calculated as a percentage value by $$Pr = \left(1.0 - \frac{d(T_A, T_B)}{d_{max}}\right) \cdot 100\%$$

with $d_{max} = \max(|T_A|, |T_B|) \cdot 180°$.

The adapted levenshtein distance for two simple trajectories ($T_1$=(f){8} and $T_2$=fr1r2r3r4f) are shown in the following third table:

|    | f 0 | f 180 | f 360 | f 540 | f 720 | f 900 | f 1080 | f 1260 | f 1440 |
|----|-----|-------|-------|-------|-------|-------|--------|--------|--------|
| f  | 180 | 0     | 180   | 360   | 540   | 720   | 900    | 1080   | 1260   |
| r1 | 360 | 180   | 1     | 181   | 361   | 541   | 721    | 901    | 1081   |
| r2 | 540 | 360   | 181   | 3     | 183   | 363   | 543    | 723    | 903    |
| r3 | 720 | 540   | 361   | 183   | 6     | 186   | 366    | 546    | 726    |
| r4 | 900 | 720   | 541   | 363   | 186   | 10    | 190    | 370    | 550    |
| f  | 1080| 900   | 720   | 541   | 363   | 186   | 10     | 190    | 370    |

As stated above, the trajectories have a similarity of 370, which is 74.3%.

The adapted levenshtein distance was also applied on a set of real measured data. The exemplary database was taken by capturing trajectories by a Global Positioning System (GPS) receiver for cycling from home to work. There are some trajectories, where some detours are included, or the data are not captured from beginning. The data are translated into TBL by the above explained transformation process and the resulting TBL strings are compared by the adopted levenshtein algorithm.

Figure 10:
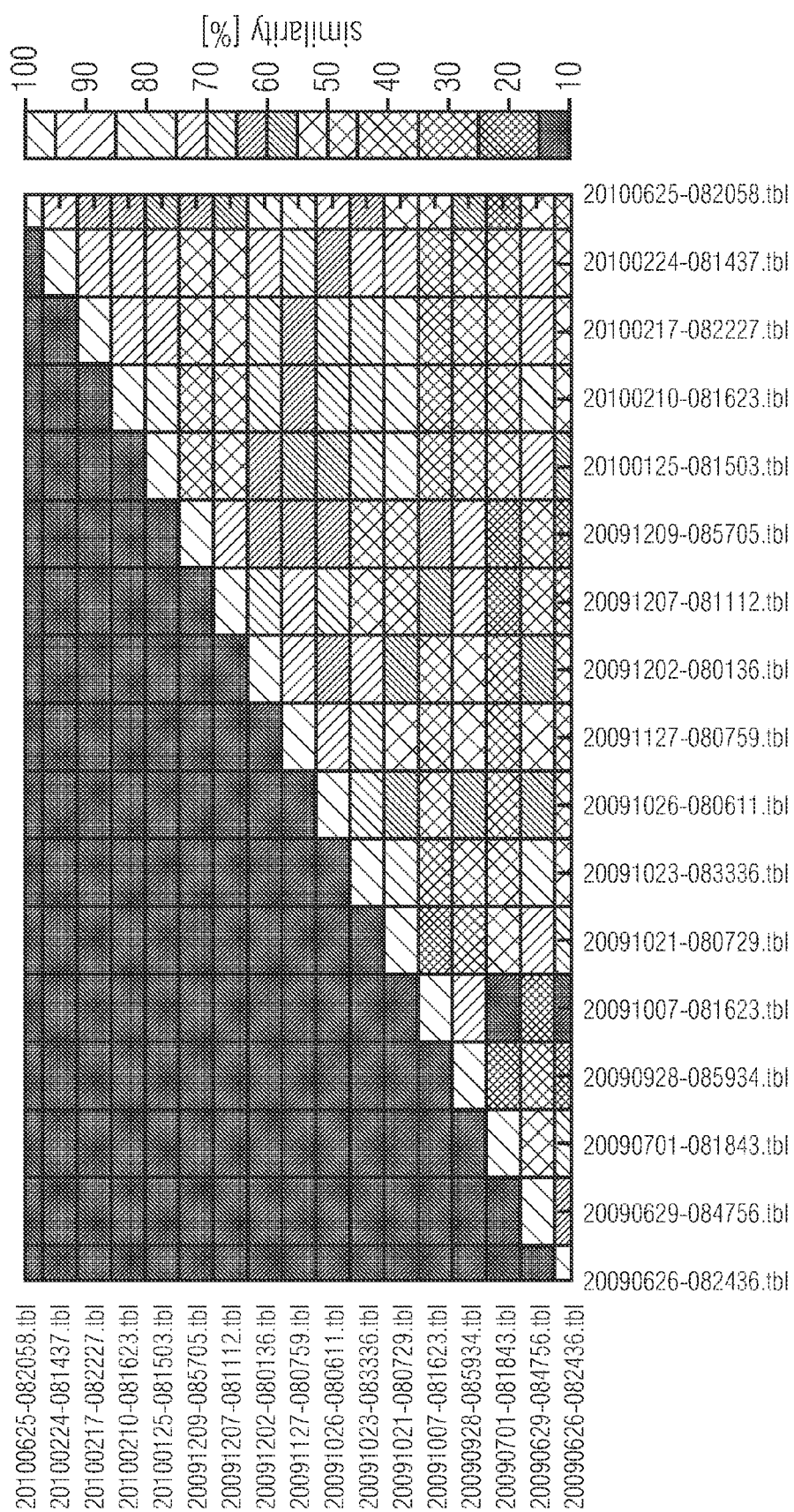
FIG. 10 shows diagram of a probability of a similarity for a plurality of trajectories against each other.

FIG. 10 depicts the probability of the similarity for all trajectories against each other. Lighter areas show are higher similarity.

Figure 11B:
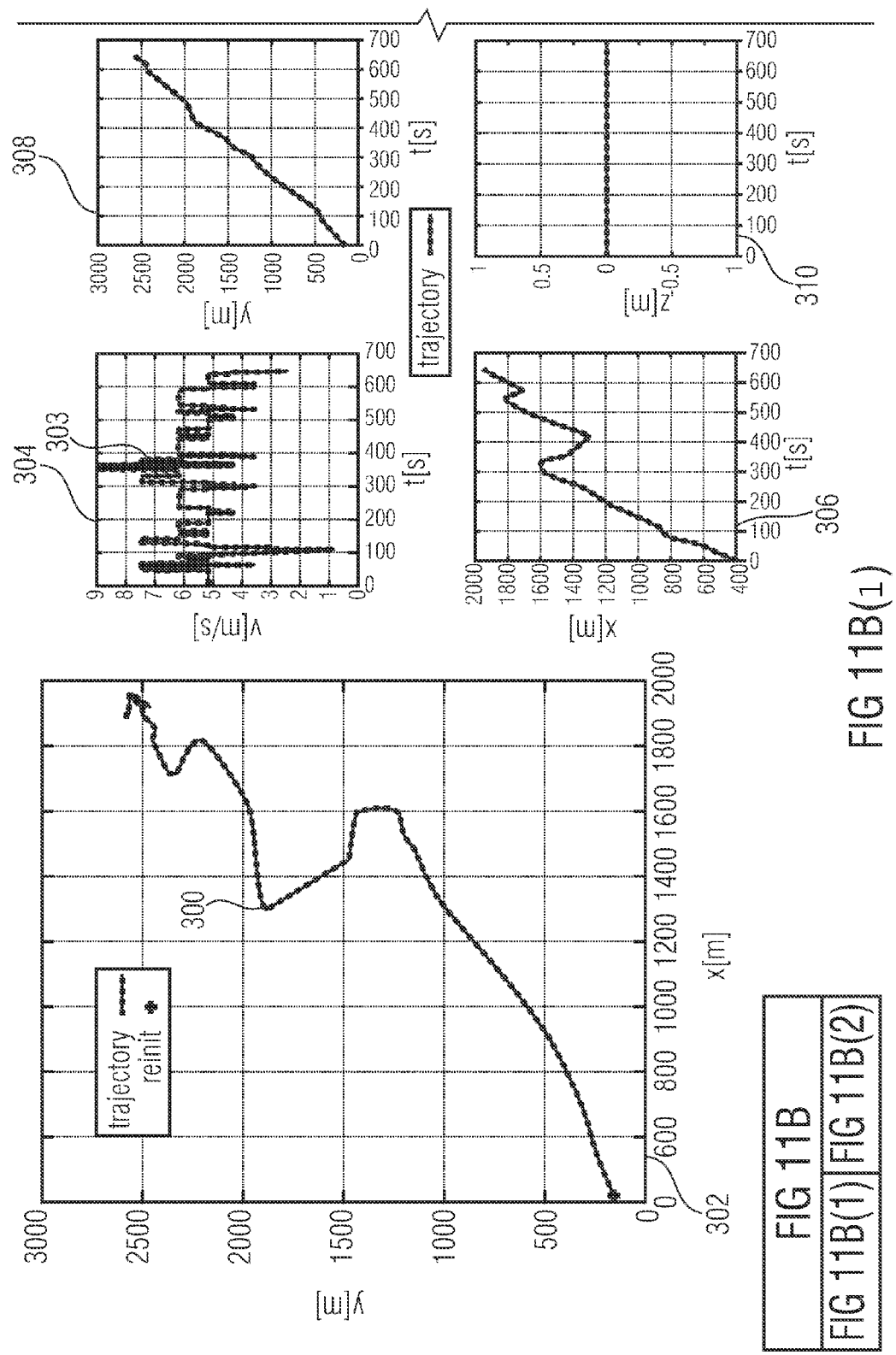
FIG. 11b shows a diagram of two similar trajectories and corresponding spatio-temporal appearances.

According to FIG. 8, the minimal similarity with 11.30% have trajectory 20090701-081843.tbl and 20090701-081843.tbl (FIG. 11a). The maximum of 81.02% have 20091202-080136.tbl and 20091026-080611.tbl (FIG. 11b).

FIG. 11a shows a diagram of two similar trajectories and corresponding spatio-temporal appearances. Thereby, a first trajectory 260 of the two similar trajectories is plotted in a xy-plane 262. Furthermore, a velocity profile 263 in meters per second (m/s) is plotted over time t in seconds (s) in a velocity plot 264. The x-component of the trajectory 260 in meters (m) is plotted over time t in seconds (s) in a x-component plot 266. The y-component of the trajectory 260 in meters (m) is plotted over time t in seconds (s) in a y-component plot 268. The z-component of the trajectory 260 in meters (m) is plotted over time t in seconds (s) in a z-component plot 270. Furthermore, a second trajectory 280 of the two similar trajectories is plotted in a xy-plane 282. Furthermore, a velocity profile 283 in meters per second (m/s) is plotted over time t in seconds (s) in a velocity plot 284. The x-component of the trajectory 280 in meters (m) is plotted over time t in seconds (s) in a x-component plot 286. The y-component of the trajectory 280 in meters (m) is plotted over time t in seconds (s) in a y-component plot 288. The z-component of the trajectory 280 in meters (m) is plotted over time t in seconds (s) in a z-component plot 290. The shown trajectories 260 and 280 have a similarity of 11.30%.

FIG. 11b shows a diagram of two similar trajectories and corresponding spatio-temporal appearances. Thereby, a first trajectory 300 of the two similar trajectories is plotted in a xy-plane 302. Furthermore, a velocity profile 303 in meters per second (m/s) is plotted over time t in seconds (s) in a velocity plot 304. The x-component of the trajectory 300 in meters (m) is plotted over time t in seconds (s) in a x-component plot 306. The y-component of the trajectory 300 in meters (m) is plotted over time t in seconds (s) in a y-component plot 308. The z-component of the trajectory 300 in meters (m) is plotted over time t in seconds (s) in a z-component plot 310. Furthermore, a second trajectory 320 of the two similar trajectories is plotted in a xy-plane 322. Furthermore, a velocity profile 323 in meters per second (m/s) is plotted over time t in seconds (s) in a velocity plot 324. The x-component of the trajectory 320 in meters (m) is plotted over time t in seconds (s) in a x-component plot 326. The y-component of the trajectory 320 in meters (m) is plotted over time t in seconds (s) in a y-component plot 328. The z-component of the trajectory 320 in meters (m) is plotted over time t in seconds (s) in a z-component plot 330. The shown trajectories 300 and 320 have a similarity of 81.02%.

Embodiments of the present invention propose a novel representation for object's trajectories based on a formal language (TBL). The TBL is constructed by the purpose of being translated online and may allow a detailed reconstruction with a zero sampling latency translation in both directions. Based on the separation from velocity and motion information, the language (TBL) describes the behavior of the object. The defined grammar $G_{TBL}$ allows (a human readable synthetisation of trajectories and) a translation from real data sets.

As already described in detail, spatio-temporal data may be translated into the TBL by the herein presented translation method. Furthermore, standing still and double moves can be translated into TBL. In addition, the translation can be applied to real data as described above.

Moreover, with an adapted levenshtein distance, translated trajectories may be compared. Based on a database of a simple comparison and real measured trajectories, the ability for comparing both synthetic and real trajectories and for providing a similarity measurement as a percentage value was depicted.

Embodiments of the present invention provide a trajectory representation for three dimensional data that better fits for trajectory comparison or for learning the behavior of moving objects. According to the concept of the present invention a intension based description of the trajectory, describing the behavior of the object is used. The representation may be established on a Chomsky-2 formal language and may be produced online.

Some embodiments of the present invention provide a more human related approach for the description language. The description may be advantageous for artificial methods like recognizing movement patterns or finding unusual object behavior. The trajectory representation according to the concept of the present invention addresses a set of requirements that spatio-temporal data is unsuitable for. The representation describes the path of an object, including the motion and behavior of its trajectory. In addition, it is intuitively readable and writable by humans, but also interpretable and analyzable by machines. The description allows a detailed reconstruction of the trajectory and may be translated on runtime (online), e.g. when the complete trajectory cannot be observed at any sampling point. Moreover, the translation process comprises a minimum latency, or in other words, (almost) no delay is introduced by converting in the representation.

Embodiments of the present invention provide a method for encoding data defining coded positions representing a trajectory of an object based on spatio-temporal data representing a time series of positions of the object. In a first step, a plurality of components of a motion vector difference between a last coded motion vector pointing from a second last coded position to a last coded position and a current motion vector pointing from the last coded position to a current position of the object is derived. In a second step, a component of the plurality of components of the motion vector difference is selected. In a third step, the current motion vector is coded based on the selected component of the motion vector difference to obtain a current coded motion vector, thereby defining a current coded position.

Unlike datastream-based methods, such as incremental coding, delta encoding, front compression, back compression, front coding and discrete cosine transformation (DCT), the concept or approach of the present invention is intension based. Thereby, an abstraction may be made from the datastreams and the behavior may be transformed into symbols. In conventional methods, the entropy of the data is the theoretical limit, in the present invention, the behavior may be abstracted, i.e. the compression rate depends on the entropy of the behavior. Furthermore, a pattern comparison may be possible in the compressed representation. In some embodiments, time data streams are considered as one unit, wherein no separation of dimensions takes place. In addition, a orientation (of the object) is implicitly considered.

In contrast to known resampling based concepts, some embodiments leave out sampling points having only little influence on the trajectory, however, all sampling points may be considered. Compared to known semantic approaches, the concept of the present invention allows restoring trajectories in detail.

In some embodiments, three-dimensional location data is transformed into a specific representation form in the "object view". Thereby, typical characteristics of trajectories may be used. For example, changes of direction usually only have an effect on one dimension (right/left or top/bottom), the larger change may be only carried out with simultaneous change of right/left, top/bottom. Furthermore, the speed may only change slightly within short time intervals. In addition, certain processes may be repeated several times. Thereby, in a first stage, a compression may be obtained by performing a dimensional reduction. In a second stage, repetitions may be detected.

Another embodiment is a method for encoding data. In a first step the location data is transformed into TBL. In a second step repetitions in TBL are searched. Optionally, in a third step the TBL symbols are encoded, for example, with a binary encoding, a Huffman encoding or a adaptive Huffman encoding.

Embodiments of the present invention provide a method for decoding data defining coded positions representing a trajectory of an object based on spatio-temporal data representing a time series of positions of the object. In a first step, a data item comprising a component value and a syntax element is received, the syntax element coding a selected component of a plurality of components of a motion vector difference between a last coded motion vector pointing from a second last coded position to a last coded position and a currently decoded motion vector pointing from a last coded position to a current coded position of the object, wherein the component value indicates the value of the selected component of the motion vector difference. In a second step, the current coded motion vector is derived by applying the component value to the selected component of the last coded motion vector, the current coded motion vector thereby pointing from the last coded position to the current coded position.

A further embodiment is a method for decoding data. Optionally, in a first step the symbols in TBL might be decoded. In a second step TBL may retransformed into location data.

In some embodiments, the TBL might comprise further properties. For example, the last x/typical expression might be stored in parentheses as a codebook. "Sampling points" (p/h/v) might be transmitted for minimizing or reducing fragments in disturbed transmissions. Furthermore, a specific construct for showing combined "right/left-top/bottom" movements might be introduced for increasing quality (with that, an almost lossless compression would be possible—depending on the transmitted floating-point number accuracy). In addition, some embodiments of the present invention may use dynamic resampling, for example, for translating into the TBL.

In contrast to known concepts, the TBL allows encoding and decoding trajectories at run time (online). Furthermore, the TBL is latency-free for compression without repetitions. Since no random access is required, past trajectories don't have to be stored. Thereby, the compression factor/quality may adjustable. For example, based on a lossy compression a lossless compression might be achieved by means of an alphabet extension. In addition, trajectories can be compared in a compressed manner.

In an exemplary application, the TBL might be used for a transmission of location datastreams to mobile terminal devices. Moreover, the TBL might be used for storing large amounts of location data, due to its high compression rate.

In the following fourth table, the compression rate (or compression factor) of TBL is compared to the compression rate of ZIP:

| railroad test in 2D/3D | original data | ZIP compression | TBL |
|---|---|---|---|
| data points | 885/885 | — | — |
| size in bytes | 14160/21240 | 4441/6428 | 2776/2897 |
| compression factor | 1:1 | 1:3.2/1:3.3 | 1:5.1/1:7.3 |
| standard deviation | 0 | 0 | 0.002 m/0.009 m |

Thereby, for TBL a non-optimized Huffman encoding, a 16 bit angle resolution, a 0.1 s time resolution and a 2.0 l/s velocity factor were used. As shown, the compression rate (or factor) of the TBL is by a factor of 1.6/2.2 higher than the compression of the known ZIP format.

Some embodiments of the present invention relate to a data stream with data items defining coded positions representing a trajectory of an object based on spatio-temporal data representing a time series of positions of the object. The data item comprises a component value and a syntax element, the syntax element coding a selected component of a plurality of components of a motion vector difference between a last coded motion vector pointing from a second last coded position to a last coded position and a currently decoded motion vector pointing from a last coded position to a current coded position of the object, wherein the component value indicates the value of the selected component of the motion vector difference.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises a system configured to electronically or optically transfer a computer program for performing one of the methods described herein to a receiver. The receiver may, for example, be a computer, a memory device or the like. The system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An encoder for encoding data defining coded positions representing a trajectory of an object based on spatio-temporal data representing a time series of positions of the object, the encoder comprising:
   a deriver configured to derive a plurality of components of a motion vector difference between a last coded motion vector pointing from a second last coded position to a last coded position and a current motion vector pointing from the last coded position to a current position of the object;
   a selector configured to select a component of the plurality of components of the motion vector difference; and
   a coder configured to code the current motion vector by coding the selected component of the motion vector difference to acquire a current coded motion vector, thereby defining a current coded position, wherein the coder is configured to not code another component or components of the plurality of components of the motion vector difference; wherein
   the time series of positions of the object are detected by a position sensor, an integrating velocity sensor or a twice-integrating acceleration sensor;
   the deriver is configured to derive the plurality of components of the motion vector difference such that a first component of the plurality of components corresponds to a first affine component of an affine coordinate system and a second component of the plurality of components corresponds to a second affine component of the affine coordinate system, wherein the affine coordinate system is oriented relative to the last coded motion vector;
   the affine coordinate system is a three-dimensional coordinate system;
   the first affine component of the affine coordinate system is a first angle measured relative to the last coded motion vector in a plane spanned by the last coded motion vector and a first vector, and the second affine component of the affine coordinate system is a second angle measured in a plane spanned by the last coded motion vector and a second vector, perpendicular to the first vector; and
   each of the deriver, the selector, and the coder is implemented using an integrated circuit, a field programmable gate array, or a digital signal processor, or a combination of at least two of the integrated circuit, the field programmable gate array, and the digital signal processor.

2. The encoder according to claim 1, wherein the deriver is configured to derive a plurality of components of a next motion vector difference between the current coded motion vector pointing from the last coded position to the current coded position and a next motion vector pointing from the current coded position to the next position of the object;
   wherein the selector is configured to select a component of the plurality of components of the next motion vector difference; and
   wherein the coder is configured to code the next motion vector based on the selected component of the next motion vector difference to acquire a next coded motion vector, thereby defining a next coded position.

3. The encoder according to claim 1, wherein the data further defines a orientation of the object at the time series of positions of the object, wherein the encoder is further configured to encode a component of a plurality of components defining the orientation of the object.

4. The encoder according to claim 1, wherein the selector is configured to compare the absolute values of the plurality of components and to select the component comprising the greatest absolute value.

5. The encoder according to claim 1, wherein the coder is configured to code a velocity component of the current coded motion vector.

6. The encoder according to claim 1, wherein the coder is configured to code a velocity component of the current coded motion vector differentially to the last coded motion vector.

7. The encoder according to claim 5, wherein the velocity component is measured along the direction of the last coded motion vector, or along the direction of a combination of the last coded motion vector and the selected component of the motion vector difference.

8. The encoder according to claim 1, wherein the coder is configured to provide a data item, wherein the data item comprises coded components indicating the selected component of the plurality of components of the motion vector difference.

9. The encoder according to claim 8, wherein the data item further comprises a component value indicating the value of the selected component of the motion vector difference.

10. The encoder according to claim 1, wherein the first vector points along the vertical direction.

11. The encoder according to claim 1, wherein the encoder is configured to translate the data into a word of a formal language.

12. The encoder according to claim 11, wherein the formal language comprises an alphabet and a set of production rules for defining coded motion vectors, the formal language allowing an indication of a repeated application of portions of the word.

13. The encoder according to claim 1, wherein the coder is configured to code the current motion vector by coding the selected component of the motion vector difference and to not code another component or components of the plurality of components of the motion vector difference, even if the plurality of components of the motion vector difference are unequal to zero.

14. A decoder for decoding data defining coded positions representing a trajectory of an object based on spatio-temporal data representing a time series of positions of the object, the decoder comprising:
   a receiver configured to receive a data item comprising a component value and coded components, the coded components coding a selected component of a plurality of components of a motion vector difference between a last coded motion vector pointing from a second last coded position to a last coded position and a currently decoded motion vector pointing from a last coded position to a current coded position of the object, wherein the component value indicates the value of the selected component of the motion vector difference, wherein the coded components do not code another component or components of the plurality of components of the motion vector difference; and
   a deriver configured to derive the current coded motion vector by applying the component value to the selected component of the last coded motion vector, the current coded motion vector thereby pointing from the last coded position to the current coded position; wherein
   the time series of positions of the object is detected by a position sensor, an integrating velocity sensor or a twice-integrating acceleration sensor;
   a first component of the plurality of components of the motion vector difference corresponds to a first affine component of an affine coordinate system and a second component of the plurality of components of the motion vector difference corresponds to a second affine component of the affine coordinate system, wherein the affine coordinate system is oriented relative to the last coded motion vector;
   the affine coordinate system is a three-dimensional coordinate system;
   the first affine component of the affine coordinate system is a first angle measured relative to the last coded motion vector in a plane spanned by the last coded motion vector and a first vector, and the second affine component of the affine coordinate system is a second angle measured in a plane spanned by the last coded motion vector and a second vector, perpendicular to the first vector; and
   each of the receiver and the deriver is implemented using an integrated circuit, a field programmable gate array, or a digital signal processor, or a combination of at least two of the integrated circuit, the field programmable gate array, and the digital signal processor.

15. The decoder according to claim 14, wherein the receiver is configured to receive a data item comprising coded components coding a velocity component of the currently decoded motion vector.

16. A method for encoding data defining coded positions representing a trajectory of an object based on spatio-temporal data representing a time series of positions of the object, wherein the time series of positions of the object is detected by a position sensor, an integrating velocity sensor or a twice-integrating acceleration sensor, the method comprising:
   deriving a plurality of components of a motion vector difference between a last coded motion vector pointing from a second last coded position to a last coded position and a current motion vector pointing from the last coded position to a current position of the object;
   selecting a component of the plurality of components of the motion vector difference; and
   coding the current motion vector by coding the selected component of the motion vector difference to acquire a current coded motion vector, thereby defining a current coded position, wherein another component or components of the plurality of components of the motion vector difference are not coded; wherein
   two components of the plurality of components of the motion vector difference are derived such that a first component of the two components corresponds to a first affine component of an affine coordinate system and a second component of the two components corresponds to a second affine component of the affine coordinate system, wherein the affine coordinate system is oriented relative to the last coded motion vector;
   the affine coordinate system is a three-dimensional coordinate system;
   the first affine component of the affine coordinate s stem is a first angle measured relative to the last coded motion vector in a plane spanned by the last coded motion vector and a first vector, and the second affine component of the affine coordinate system is a second angle measured in a plane spanned by the last coded motion vector and a second vector, perpendicular to the first vector; and
   the method is performed using an integrated circuit, a field programmable gate array, or a digital signal processor, or a combination of at least two of the integrated circuit, the field programmable gate array, and the digital signal processor.

17. A method for decoding data defining coded positions representing a trajectory of an object based on spatio-temporal data representing a time series of positions of the object, wherein the time series of positions of the object is detected by a position sensor, an integrating velocity sensor or a twice-integrating acceleration sensor, the method comprising:
   receiving a data item comprising a component value and coded components, the coded components coding a selected component of a plurality of components of a motion vector difference between a last coded motion vector pointing from a second last coded position to a last coded position and a currently decoded motion vector pointing from a last coded position to a current coded position of the object, wherein the component value indicates the value of the selected component of the motion vector difference, wherein the coded components do not code another component or components of the plurality of components of the motion vector difference; and
   deriving the current coded motion vector by applying the component value to the selected component of the last coded motion vector, the current coded motion vector thereby pointing from the last coded position to the current coded position; wherein
   a first component of the plurality of components of the motion vector difference corresponds to a first affine component of an affine coordinate system and a second component of the plurality of components of the motion vector difference corresponds to a second affine component of the affine coordinate system, wherein the coordinate system is oriented relative to the last coded motion vector;

the affine coordinate system is a three-dimensional coordinate system;

the first affine component of the affine coordinate system is a first angle measured relative to the last coded motion vector in a plane spanned by the last coded motion vector and a first vector, and the second affine component of the affine coordinate system is a second angle measured in a plane spanned by the last coded motion vector and a second vector, perpendicular to the first vector; and the method is performed using an integrated circuit, a field programmable gate array, or a digital signal processor, or a combination of at least two of the integrated circuit, the field programmable gate array, and the digital signal processor.

18. A non-transitory computer readable medium comprising a computer program comprising a program code for performing, when running on a computer or microprocessor, a method for encoding data defining coded positions representing a trajectory of an object based on spatio-temporal data representing a time series of positions of the object, wherein the time series of positions of the object is detected by a position sensor, an integrating velocity sensor or a twice-integrating acceleration sensor, the method comprising:

deriving a plurality of components of a motion vector difference between a last coded motion vector pointing from a second last coded position to a last coded position and a current motion vector pointing from the last coded position to a current position of the object;

selecting a component of the plurality of components of the motion vector difference; and coding the current motion vector by coding the selected component of the motion vector difference to acquire a current coded motion vector, thereby defining a current coded position, wherein another component or components of the motion vector difference are not coded; wherein two components of the plurality of components of the motion vector difference are derived such that a first component of the two components corresponds to a first affine component of an affine coordinate system and a second component of the two components corresponds to a second affine component of the affine coordinate system, wherein the affine coordinate system is oriented relative to the last coded motion vector;

the affine coordinate system is a three-dimensional coordinate system; and the first affine component of the affine coordinate system is a first angle measured relative to the last coded motion vector in a plane spanned by the last coded motion vector and a first vector, and the second affine component of the affine coordinate system is a second angle measured in a plane spanned by the last coded motion vector and a second vector, perpendicular to the first vector.

19. A non-transitory computer readable medium comprising a computer program comprising a program code for performing, when running on a computer or microprocessor, a method for decoding data defining coded positions representing a trajectory of an object based on spatio-temporal data representing a time series of positions of the object, wherein the time series of positions of the object is detected by a position sensor, an integrating velocity sensor or a twice-integrating acceleration sensor, the method comprising:

receiving a data item comprising a component value and coded components, the coded components coding a selected component of a plurality of components of a motion vector difference between a last coded motion vector pointing from a second last coded position to a last coded position and a currently decoded motion vector pointing from a last coded position to a current coded position of the object, wherein the component value indicates the value of the selected component of the motion vector difference, wherein the coded components do not code another component or components of the plurality of components of the motion vector difference; and deriving the current coded motion vector by applying the component value to the selected component of the last coded motion vector, the current coded motion vector thereby pointing from the last coded position to the current coded position; wherein a first component of the plurality of components of the motion vector difference corresponds to a first affine component of an affine coordinate system and a second component of the plurality of components of the motion vector difference corresponds to a second affine component of the affine coordinate system, wherein the affine coordinate system is oriented relative to the last coded motion vector;

the affine coordinate system is a three-dimensional coordinate system; and the first affine component of the affine coordinate s stem is a first angle measured relative to the last coded motion vector in a plane spanned by the last coded motion vector and a first vector, and the second affine component of the affine coordinate system is a second angle measured in a plane spanned by the last coded motion vector and a second vector, perpendicular to the first vector.

* * * * *